US012655240B2

(12) United States Patent
Li et al.

(10) Patent No.: US 12,655,240 B2
(45) Date of Patent: Jun. 16, 2026

(54) MEDIUM DENSITY POLYETHYLENE COMPOSITIONS WITH BROAD ORTHOGONAL COMPOSITION DISTRIBUTION

(71) Applicant: ExxonMobil Chemical Patents Inc., Baytown, TX (US)

(72) Inventors: Wen Li, Houston, TX (US); Haiqing Peng, Sugar Land, TX (US); Michael A. Leaf, Houston, TX (US); Kevin A. Stevens, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 476 days.

(21) Appl. No.: 18/250,259

(22) PCT Filed: Nov. 22, 2021

(86) PCT No.: PCT/US2021/072552

§ 371 (c)(1),
(2) Date: Apr. 24, 2023

(87) PCT Pub. No.: WO2022/120321

PCT Pub. Date: Jun. 9, 2022

(65) Prior Publication Data

US 2023/0399426 A1 Dec. 14, 2023

Related U.S. Application Data

(60) Provisional application No. 63/199,020, filed on Dec. 2, 2020.

(51) Int. Cl.

| | |
|---|---|
| ***C08F 210/16*** | (2006.01) |
| ***C08F 4/02*** | (2006.01) |
| ***C08F 4/76*** | (2006.01) |

(52) U.S. Cl.

CPC .............. *C08F 210/16* (2013.01); *C08F 4/02* (2013.01); *C08F 4/76* (2013.01); *C08F 2420/10* (2021.01); *C08F 2800/20* (2013.01)

(58) Field of Classification Search

CPC .................. C08F 210/14; C08F 210/16; C08F 2420/10; C08F 2500/04; C08F 2500/05; C08F 2500/10; C08F 2500/12; C08F 2500/37; C08F 2500/39; C08F 2800/20; C08F 4/02; C08F 4/65904; C08F 4/65916; C08F 4/65925; C08F 4/65927; C08F 4/76

See application file for complete search history.

(56) References Cited

U.S. PATENT DOCUMENTS 6,242,545 B1 6/2001 Jejelowo et al.
6,248,845 B1 6/2001 Loveday et al.
6,528,597 B2 3/2003 Loveday et al.
6,936,675 B2 8/2005 Szul et al.
6,956,088 B2 10/2005 Farley et al.
7,119,153 B2 10/2006 Jensen et al.
7,172,816 B2 2/2007 Szul et al.
7,179,876 B2 2/2007 Szul et al.
7,381,783 B2 6/2008 Loveday et al.
7,547,754 B2 6/2009 McDaniel et al.
7,572,875 B2 8/2009 Jensen et al.
7,625,982 B2 12/2009 Martin et al.
8,247,065 B2 8/2012 Best et al.
8,378,043 B2 2/2013 Graham et al.
8,383,754 B2 2/2013 Yang et al.
8,476,392 B2 7/2013 Kolb et al.
8,691,715 B2 4/2014 Yang et al.
8,722,567 B2 5/2014 Slawinski
8,846,841 B2 9/2014 Yang et al.
8,940,842 B2 1/2015 Yang et al.
9,006,367 B2 4/2015 McDaniel et al.
9,096,745 B2 8/2015 Lam et al.
9,115,229 B2 8/2015 Slawinski
9,181,369 B2 11/2015 Tso et al.
9,181,370 B2 11/2015 Sukhadia et al.
9,217,049 B2 12/2015 Yang et al.
9,290,593 B2 3/2016 Cho et al.
9,334,350 B2 5/2016 McDaniel et al.
9,447,265 B2 9/2016 Lam et al.
10,040,883 B2 8/2018 Sohn
10,344,102 B2 7/2019 Kim et al.
2005/0228139 A1 10/2005 Lee et al.
2008/0318015 A1 12/2008 Stephenne et al.
2009/0156764 A1 6/2009 Malakoff et al.
2012/0172548 A1 7/2012 Cho et al.
2013/0137828 A1 5/2013 Michie, Jr. et al.
2015/0291748 A1 10/2015 Malakoff
2016/0347886 A1 12/2016 Lue et al.
2019/0042227 A1 2/2019 Sharma
2019/0119417 A1 4/2019 Li et al.
2020/0071437 A1 3/2020 Stevens et al.
2021/0238321 A1 8/2021 Silva et al.

*Primary Examiner* — Ana L. Woodward

(74) *Attorney, Agent, or Firm* — C. Tumey Law Group PLLC

(57) ABSTRACT

Provided herein are metallocene-catalyzed polyethylene compositions that exhibit a high degree of broad orthogonal composition distribution ("BOCD"), meaning that they have a relatively high degree of short-chain branching in higher-molecular-weight chains, as compared to the short-chain branching in lower-molecular weight chains. The compositions may have 80 to 99.9 wt % units derived from ethylene and 0.1 to 20 wt % units derived from a $C_3$ to $C_{40}$ α-olefin comonomer; density from 0.925 to 0.950 g/cm$^3$, melt index ($I_{2.16}$) within the range from 0.1 to 5 g/10 min, and molecular weight distribution (Mw/Mn) within the range from 4.0 to 8.0. The polyethylene compositions may be formed any suitable polymerization method, although methods according to some embodiments may include utilizing a pre-trim catalyst slurry that is optionally combined with trim catalyst solution to achieve on-the-fly adjustment of catalyst ratios for producing these polyethylene compositions among other polyethylene compositions in a production campaign.

19 Claims, 4 Drawing Sheets

MEDIUM DENSITY POLYETHYLENE COMPOSITIONS WITH BROAD ORTHOGONAL COMPOSITION DISTRIBUTION

CROSS-REFERENCE OF RELATED APPLICATIONS

This application is a National Phase Application claiming priority to PCT Application Serial No. PCT/US2021/072552, filed Nov. 22, 2021, which claims benefit of U.S. Provisional Application 63/199,020 filed Dec. 2, 2020, entitled "Medium Density Polyethylene Compositions With Broad Orthogonal Composition Distribution", the entireties of which are incorporated by reference herein.

FIELD

The present disclosure relates to polyolefin compositions and catalysts for making them, and in particular polyethylene homo- and co-polymers, articles including such polyolefin compositions, and methods for producing such polyolefin compositions and catalysts.

BACKGROUND

Medium density polyethylene (MDPE) polymer compositions are in high demand for many applications, including various films (such as cast films, shrink films, and blown films), sheets, membranes such as geomembranes, sacks, pipes (e.g., polyethylene of raised temperature (PE-RT) pipes, utility pipes, and gas distribution pipes), roto-molded parts, blow-molded flexible bottles or other containers, and various other blow molded/extruded articles such as bottles, drums, jars, and other containers. MDPE offers a balance of mechanical strength, stress crack resistance, and flexibility, between the more pliable but weaker low density polyethylenes (LDPEs) and the stronger, stiffer high-density polyethylenes (HDPEs).

MDPEs, like linear LDPEs (LLDPE) and HDPE, incorporate some degree of comonomer, typically alpha-olefin comonomer, particularly when made in a low-pressure polymerization process such as, for example, solution, slurry, and/or gas phase polymerization processes. Such polyethylene compositions may therefore be referred to as ethylene alpha-olefin copolymers. Polymerization takes place in the presence of activated catalyst systems such as those employing a Ziegler-Natta catalyst, a chromium based catalyst, a vanadium catalyst, a metallocene catalyst, a mixed catalyst (i.e., two or more different catalysts co-supported on the same carrier such as a bimodal catalyst), other advanced catalysts, or combinations thereof. In general, these catalysts when used in a catalyst system all produce a variety of polymer chains in a polyolefin polymer composition that vary in molecular weight and comonomer incorporation. In some cases, this variation becomes a "signature" to the catalyst itself. For example, a polyolefin's composition distribution may be heavily influenced by the type of catalyst system used, as well as the polymerization process conditions.

Much effort has been placed in understanding how the comonomer is distributed along the polymer carbon chain or simply polymer chain of a polyolefin polymer such as a polyethylene composition. For example, the composition distribution of an ethylene alpha-olefin copolymer refers to the distribution of comonomer (short chain branches) among the molecules that comprise the polyethylene polymer.

When the amount of short chain branches varies among the polymer carbon chains of different length, the polymer or resin is said to have a Broad Composition Distribution (BCD). For example, for an ethylene-hexene copolymer, hexene distribution varies from low to high even among polymer chains of similar length (e.g., the polydispersity index or PDI among those chains is narrow). When the amount of comonomer per about 1000 carbons is similar among the polyethylene molecules of different polymer chain lengths or molecular weights, the composition distribution is said to be "narrow" or have a Narrow Composition Distribution (NCD).

The composition distribution is known to influence the properties of copolymers, for example, extractables content, environmental stress crack resistance, heat sealing, dart drop impact resistance, and tear resistance or strength. The composition distribution of a polyolefin may be readily measured by methods known in the art, for example, Temperature Raising Elution Fractionation (TREF) or Crystallization Analysis Fractionation (CRYSTAF). See, for example, U.S. Pat. No. 8,378,043, Col. 3 and Col. 4.

Polymers made with Zeigler Natta catalysts are considered to be "conventional" in which the composition distribution is broad but the high molecular weight fractions are higher density (i.e., less comonomer) than the lower molecular weight fraction (high comonomer).

In contrast, metallocene catalysts typically produce a polyolefin polymer composition with an NCD. A metallocene catalyst is generally a metal complex of a transitional metal, typically, a Group 4 metal, and one or more cyclopentadienyl (Cp) ligands or rings. As stated above, NCD generally refers to the comonomer being evenly distributed or not vary much along the polymer chain. An illustration is provided as FIG. Ta.

More recently, a third distribution has been described for a polyolefin polymer composition having a Broad Orthogonal Composition Distribution (BOCD) in which the comonomer is incorporated predominantly in the high molecular weight chains. A substituted hafnocene catalyst has been noted to produce this type of distribution. See, for example, U.S. Pat. Nos. 6,242,545, 6,248,845, 6,528,597, 6,936,675, 6,956,088, 7,172,816, 7,179,876, 7,381,783, 8,247,065, 8,378,043, 8,476,392; U.S. Patent Application Publication Nos. 2015/0291748 and 2020/0071437. An illustration is provided as FIG. 1*b*. This distribution has been noted for its improved physical properties, for example, ease in fabrication of end-use articles as well as stiffness and toughness in multiple applications such as films that can be measured by dart drop impact resistance and tear resistance or strength.

In another patent, U.S. Pat. No. 9,290,593 ('593 patent) teaches that the term "BOCD" is a novel terminology that is currently developed and relates to a polymer structure. The term "BOCD structure" means a structure in which the content of the comonomer such as alpha olefins is mainly high at a high molecular weight main chain, that is, a structure in which the content of a short chain branching (SCB) is increased as moving toward the high molecular weight. The '593 patent also teaches a BOCD Index. More recently, another U.S. Pat. No. 10,344,102 ('102 patent) teaches a similar value, the Comonomer Incorporation (CI) index. Both aim to capture a comparison of SCB content in high-molecular weight chains vs. SCB content in low molecular-weight chains of the polymer composition, generally as (#SCB at high MW-#SCB at low molecular weight)/(#SCB at low molecular weight). The patents differ somewhat in their description of how the "high molecular weight" and "low molecular weight" points are identified and calculated, but both base the identification on GPC-4D plots of SCB content vs. molecular weight (see FIG. 1 of the '593 patent and FIG. 4 of the '102 Patent). The '593 patent asserts the BOCD Index of its polymer compositions may be in the range of 1 to 5, preferably 2 to 4, more preferably 2 to 3.5; similarly, the '102 patent asserts the CI index of its polymer compositions range from 0.5 to 5.

BOCD behavior in a polymer composition has been associated with a good balance of mechanical and optical properties and has been an important goal in the development of new polymer products. BOCD has been targeted and improved in various linear PE compositions, see for instance US Patent Publication No. 2020/0071437; but there remains a need for MDPE compositions having BOCD, and furthermore, the challenge also remains to achieve higher degrees of BOCD than has been achieved previously. In addition, it may be desired to achieve this BOCD while maintaining low degrees of long-chain branching (LCB), that is, such that the polymer composition is substantially linear. It is known PE resins with LCB, such as LDPE, are mechanically weaker than linear PE resins and will not be suitable for many applications.

Other relevant references in this regard include: U.S. Patent Application Publication Nos. 2009/0156764 and 2019/0119417; as well as U.S. Pat. Nos. 7,119,153, 7,547,754, 7,572,875, 7,625,982, 8,383,754, 8,691,715, 8,722,567, 8,846,841, 8,940,842, 9,006,367, 9,096,745, 9,115,229, 9,181,369, 9,181,370, 9,217,049, 9,334,350, 9,447,265, 10,040,883; 10,344,102. See also WO2008/136621; WO 2015/123164; WO2019/027598; EP 2076565B1; EP 1732958B1; EP 1674504A1.

SUMMARY

In some embodiments, the present disclosure provides polyethylene compositions, and especially medium density polyethylene (MDPE) compositions. The polyethylene compositions may have density within the range from 0.925 to 0.950 g/cm$^3$, and furthermore may be ethylene-copolymer compositions (e.g., having units derived from ethylene and one or more $C_3$ to $C_{40}$ $\alpha$-olefin comonomer). The polyethylene compositions have a high degree of broad orthogonal composition distribution (BOCD), meaning that a substantially higher degree of short chain branching is present on longer molecular-weight polymer chains than on shorter molecular-weight polymer chains within the polyethylene composition. This highly BOCD nature may be reflected in any of various measurements. As one example, polyethylene compositions may have an SCB-Slope Index greater than or equal to 5, where SCB-Slope Index is the slope of the linear regression of #SCB (short chain branches per 1000 carbon atoms) vs. Log(MW) between Log(MW)=4.5 and Log (MW)=5.5, on a GPC plot of molecular weight distribution and comonomer distribution of the polyethylene composition. This may be represented in mathematical terms as $$\frac{[\#SCB_{5.5} - \#SCB_{4.5}]}{5.5 - 4.5} \geq 5,$$

where $\#SCB_{5.5}$ is #SCB (short chain branches per 1000 carbon atoms) at Log(MW)=5.5, $\#SCB_{4.5}$ is #SCB at Log (MW)=4.5, all on a GPC plot of molecular weight distribution of the polyethylene composition, and further where the term [$\#SCB_{5.5}$-$\#SCB_{4.5}$] represents the linear regression of the #SCB plot between Log(MW)=4.5 and Log(MW)=5.5.

More generally, the BOCD nature of the polyethylene compositions may also or instead be captured in one or both of the following properties: 15-85 Comonomer Slope Index (defined as described herein) greater than 4; and/or Mn-Mz Comonomer Slope Index (also defined as described herein) greater than 5.

Polyethylene compositions of the present disclosure may also have melt index within the range from 0.1 to 5 g/10 min and molecular weight distribution (Mw/Mn) within the range from 4.0 to 12.0.

The polyethylene compositions advantageously exhibit an excellent balance of flexibility, processability, and mechanical strength. In some embodiments, the polyethylene compositions may exhibit one or more of: modulus index greater than 110, single point notched constant tensile load (NCTL) value greater than 3000 hours; and elongation at yield greater than 12%.

The present disclosure also includes articles made from the polyethylene compositions.

Also provided are methods for making the polyethylene compositions, including by use of a catalyst system comprising two metallocene catalysts.

DETAILED DESCRIPTION

Figure 1A:
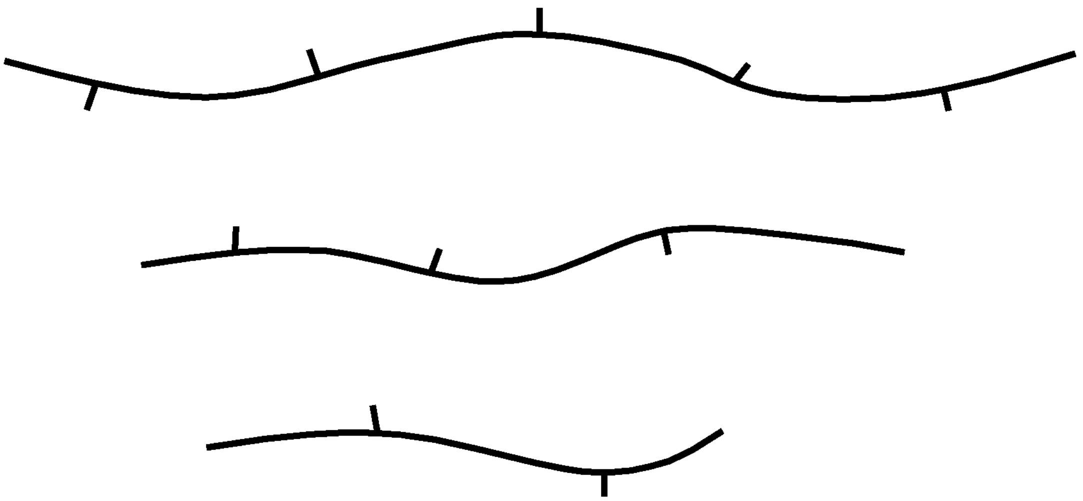
FIG. 1*a* is an illustration of polyolefin chains consistent with a narrow composition distribution (NCD).
Figure 1B:
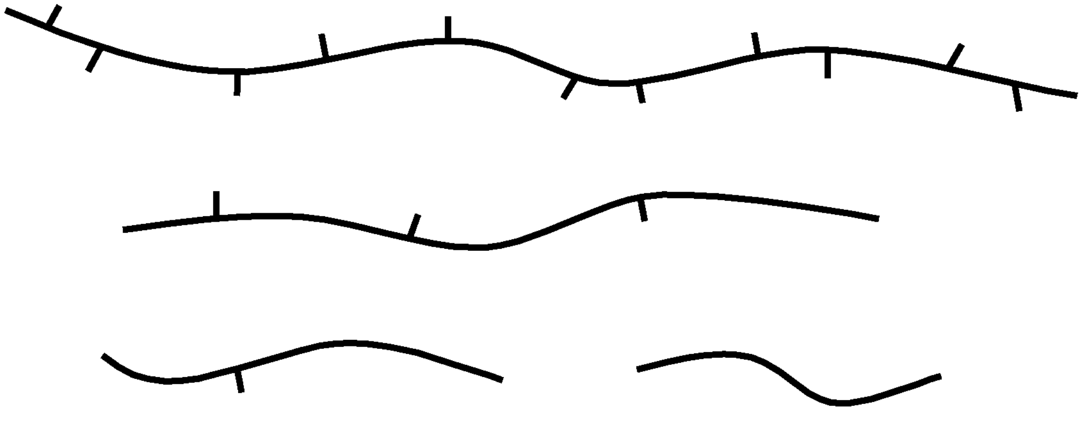
FIG. 1*b* is an illustration of polyolefin chains consistent with a broad orthogonal composition distribution (BOCD).

The present disclosure relates to polyolefin compositions, their methods of manufacture, and articles including and/or made from the polyolefin compositions. In a particular focus, the polyolefin compositions may be polyethylene compositions.

Polyethylene compositions in accordance with the present disclosure are preferably copolymers of majority ethylene (e.g., 80, 85, 90, 95, 98, 99 wt % or more ethylene-derived units, preferably 98 wt % or more) and one or more $C_3$ to $C_{40}$ comonomers (e.g., 1-butene, 1-hexene, 1-octene). Preferably, such polyethylene compositions are medium-density polyethylene (MDPE) compositions (e.g., having density within the range from 0.925 to 0.950 g/cm$^3$ in accordance with various embodiments) that exhibit a high degree of broad orthogonal composition distribution (BOCD); that is, with a high degree of short chain branching (SCB)—also referred to as comonomer incorporation—on longer-molecular weight chains within the polyethylene composition, as compared to SCB in the lower-molecular weight chains of the polyethylene composition. The polyethylene compositions also are preferably substantially linear, which may be indicated through, e.g., the similarity of their Mz/Mw ratios (z-average molecular weight to weight-average molecular weight ratios) to their melt index ratios (MIR, the ratio of high load melt index (HLMI, 21.6 kg—also referred to as $I_{21.6}$) to melt index (MI, 2.16 kg—also referred to as $I_2$ or $I_{2.16}$)).

Polyethylene compositions in accordance with the present disclosure advantageously exhibit an excellent balance of flexibility, processability, and mechanical strength. In particular, mechanical strength and flexibility are typically conflicting properties. Applications such as PE-RT pipes and other MDPE applications require delicate balance of mechanical strength and flexibility. Mechanical strength is a known function of density, molecular weight, and molecular weight distribution (the correlation may be expressed, e.g., by the Modulus index), and other factors. Polyethylene compositions in accordance with the present disclosure surprisingly achieve higher modulus at given density, molecular weight, and molecular weight distribution. Thus, such compositions may allow lowering density for better flexibility and stress crack resistance (as compared to, e.g., HDPE compositions), while still meeting mechanical strength requirements. It is believed the high degree of BOCD of these MDPE compositions helps them achieve this feature. Thus, the present compositions are particularly advantageous for producing many articles needing adequate flexibility while maintaining superior mechanical strength, such as various films (such as cast films, shrink films, and blown films), sheets, membranes such as geomembranes, sacks, pipes (e.g., polyethylene of raised temperature (PE-RT) pipes, utility pipes, and gas distribution pipes), rotomolded parts, blow-molded flexible bottles or other containers, and various other blow molded/extruded articles such as bottles, drums, jars, and other containers.

Further details of the polyethylene compositions are described below, following a listing of various definitions for use in reading this document.

Definitions

The term "polyethylene" refers to a polymer having at least 50 wt % ethylene-derived units, such as at least 70 wt % ethylene-derived units, such as at least 80 wt % ethylene-derived units, such as at least 90 wt % ethylene-derived units, or at least 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically.

The term "alpha-olefin" or "α-olefin" refers to an olefin having a terminal carbon-to-carbon double bond in the structure thereof $R^1R^2C{=}CH_2$, where $R^1$ and $R^2$ can be independently hydrogen or any hydrocarbyl group; such as $R^1$ is hydrogen and $R^2$ is an alkyl group. A "linear alpha-olefin" is an alpha-olefin wherein $R^1$ is hydrogen and $R^2$ is hydrogen or a linear alkyl group.

For the purposes of the present disclosure, ethylene shall be considered an α-olefin.

When a polymer or copolymer is referred to herein as comprising an alpha-olefin (or α-olefin), including, but not limited to ethylene, 1-butene, and 1-hexene, the olefin present in such polymer or copolymer is the polymerized form of the olefin. For example, when a polymer is said to have an "ethylene content" or "ethylene monomer content" of 80 to 99.9 wt %, or to comprise "ethylene-derived units" at 80 to 99.9 wt %, it is understood that the mer unit in the copolymer is derived from ethylene in the polymerization reaction and said derived units are present at 80 to 99.9 wt %, based upon the weight of ethylene content plus comonomer content.

As used herein, and unless otherwise specified, the term "$C_n$" means hydrocarbon(s) having n carbon atom(s) per molecule, wherein n is a positive integer.

The terms "substituent," "radical," "group," and "moiety" may be used interchangeably.

A "catalyst composition" or "catalyst system" is the combination of at least two catalyst compounds, a support material, an optional activator, and an optional co-activator. For the purposes of this invention and the claims thereto, when catalyst systems or compositions are described as comprising neutral stable forms of the components, it is well understood by one of ordinary skill in the art, that the ionic form of the component is the form that reacts with the monomers to produce polymers. When it is used to describe such after activation, it means the support, the activated complex, and the activator or other charge-balancing moiety. The transition metal compound may be neutral as in a precatalyst, or a charged species with a counter ion as in an activated catalyst system.

The terms "cocatalyst" and "activator" are used herein interchangeably and are defined to be any compound which can activate any one of the catalyst compounds herein by converting the neutral catalyst compound to a catalytically active catalyst compound cation.

Polyethylene Compositions

In various embodiments, the present disclosure describes compositions of, and/or methods for making, polyethylene compositions including polyethylene homopolymers, and/or copolymers of ethylene and one, two, three, four or more $C_3$ to $C_{40}$ olefin comonomers, for example, $C_3$ to $C_{20}$ α-olefin comonomers.

For example, the polyethylene compositions may include copolymers of ethylene and one, two or three or more different $C_2$ to $C_{40}$ olefins. In particular embodiments, the polyethylene compositions comprise a majority of units derived from polyethylene, and units derived from one or more $C_3$ to $C_{40}$ comonomers, preferably $C_3$ to $C_{20}$ α-olefin comonomers (e.g., propylene, 1-butene, 1-hexene, 1-octene, 1-decene, 1-dodecene, preferably propylene, 1-butene, 1-hexene, 1-octene, or a mixture thereof; most preferably 1-butene and/or 1-hexene).

The polyethylene composition may comprise the ethylene-derived units in an amount of at least 80 wt %, or 85 wt %, preferably at least 90, 93, 94, 95, or 96 wt % (for instance, in a range from a low of 80, 85, 90, 91, 92, 93, 94, 95, 96, or 97 wt %, to a high of 94, 95, 95.5, 96, 96.5, 97, 97.5, or 98 wt %, with ranges from any foregoing low end to any foregoing high end contemplated, provided the high is greater than the low). For instance, the polyethylene composition may comprise 94 or 95 wt % to 97 or 98 wt % ethylene-derived units. Comonomer units (e.g., $C_2$ to $C_{20}$ $\alpha$-olefin-derived units, such as units derived from butene, hexene, and/or octene) may be present in the polyethylene composition within the range from a low of 2, 2.5, 3, 3.5, 4, 4.5, 5, or 6 wt %, to a high of 3, 4, 5, 6, 7, 8, 9, 10, 15, or 20 wt %, with ranges from any foregoing low ends to any foregoing high ends contemplated (provided the high is greater than the low end). For instance, the polyethylene composition may comprise 2, 2.5, or 3 wt % to 5 or 6 wt % comonomer units.

Several suitable comonomers were already noted, although in various embodiments, other $\alpha$-olefin comonomers are contemplated. For example, the $\alpha$-olefin comonomer can be linear or branched, and two or more comonomers can be used, if desired. Examples of suitable comonomers include linear $C_3$-$C_{20}$ $\alpha$-olefins (such as butene, hexene, octane as already noted), and $\alpha$-olefins having one or more $C_1$-$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. In some embodiments, comonomers include propylene, 1-butene, 1-pentene, 4-methyl-1-pentene, 1-hexene, 1-octene and styrene.

Polyethylene Composition—Molecular Characteristics

A polyethylene composition according to various embodiments can have a density of 0.925 to 0.950 g/cm$^3$, such as 0.930 to 0.947 g/cm$^3$. For example, polyethylene compositions may have a density from a low end of any one of 0.925, 0.926, 0.927, 0.928, 0.929, 0.931, 0.932, 0.933, 0.934, or 0.935 g/cm$^3$ to a high end of any one of 0.940, 0.941, 0.942, 0.943, 0.944, 0.945, 0.946, 0.947, 0.948, 0.949, or 0.950 g/cm$^3$, with ranges of various embodiments including any combination of any upper or lower value disclosed herein. Density herein is measured by displacement method according to ASTM D1505.

In various embodiments, the polyethylene composition has one or more, two or more, or, preferably, all of the following molecular weight properties:

- weight-average molecular weight (Mw) within the range generally from 75,000 to 300,000, such as from a low end of any one of 90,000 g/mol; 100,000 g/mol; 110,000 g/mol; 115,000 g/mol; 120,000 g/mol; 125,000; and 130,000 g/mol, to a high end of any one of 145,000 g/mol; 150,000 g/mol; 155,000 g/mol; 160,000 g/mol; 170,000 g/mol; 180,000 g/mol; 190,000 g/mol; 200,000 g/mol; 210,000 g/mol; 225,000 g/mol; and 250,000 g/mol. Ranges from any one of the foregoing low ends to any one of the high ends are contemplated in various embodiments, provided the high end is greater than the low end. For example, Mw can be within the range from 90,000 to 170,000 g/mol or 115,000 to 160,000 g/mol in particular embodiments, such as 120,000 g/mol to 155,000 g/mol.
- number-average molecular weight (Mn) generally within the range from 15,000 to 50,000 g/mol, such as from a low end of any one of 15,000 g/mol; 16,000 g/mol; 17,000 g/mol; 18,000 g/mol; 19,000 g/mol, and 20,000 g/mol to a high end of any one of 25,000 g/mol; 26,000 g/mol; 27,000 g/mol; 28,000 g/mol; 29,000 g/mol; 30,000 g/mol, 35,000 g/mol; 40,000 g/mol, and 50,000 g/mol. Ranges from any one of the foregoing low ends to any one of the high ends are contemplated in various embodiments (for instance, Mn may be within the range from 15,000 g/mol to 50,000 g/mol, such as 15,000 or 20,000 g/mol to 25,000 or 30,000 g/mol).
- Z-average molecular weight (Mz) generally within the range from 200,000 to 700,000 g/mol, such as from a low end of any one of 250,000 g/mol; 300,000 g/mol; 325,000 g/mol; and 350,000 g/mol to a high end of any one of 400,000 g/mol; 450,000 g/mol; 500,000 g/mol; 550,000 g/mol; 600,000 g/mol; 650,000 g/mol; and 700,000 g/mol. Ranges from any one of the foregoing low ends to any one of the high ends are contemplated in various embodiments (for instance, Mz may be within the range from 200,000 or 250,000 to 700,000 g/mol, such as 300,000 g/mol to 500,000 g/mol).

Furthermore, polyethylene compositions in accordance with various embodiments may have Mw/Mn value (sometimes also referred to as polydispersity index, PDI) within the range from a low of 3.0, 3.5, 4.0, 4.5, 4.7, 5.0, 5.1, or 5.2 to a high of 5.5, 5.7, 6.0, 6.1, 6.2, 6.3, 6.4, 6.5, 7.0, 7.5, 8.0, 8.5, 9.0, 9.5, 10.0, 11.0, or 12.0 (with ranges from any low end to any high end contemplated, such as Mw/Mn from 4.0 to 12.0, such as from 4.0 to 8.0 or 9.0, or 5.0 to 7.0 or 8.0). Mz/Mw ratio of the polyethylene compositions of various embodiments are within the range from 1, 1.5, 2, or 2.5 to 3.0, 3.5, 4.0, 4.5, 5.0, 5.5, or 6.0 (with ranges from any low end to any high end contemplated, such as Mz/Mw from 1.5 to 5, such as 2.5 to 4). Alternatively, polyethylene compositions of various embodiments may be characterized as having Mz/Mw less than 5, such as less than 4.5, less than 4, or less than 3.5.

Polyethylene compositions according to various embodiments may have a surprising combination of relatively high Mw/Mn values with relatively low Mz/Mw values. The general knowledge suggests that Mz/Mw would increase with increasing Mw/Mn, where Mz/Mw is understood to indicate the relative significance of the high molecular weight fraction within the polymer composition. This suggests polyethylene compositions in accordance with some embodiments herein may have a relatively less prominent high-molecular-weight fraction. While a prominent high molecular weight fraction in some circumstances may be beneficial, it is also known to relate to high die swells, unstable melt viscosity, and high melt elasticity in the converting process, and these properties may not be desired in some processes and applications. Slower crystallization associated with a prominent high molecular weight fraction could also cause some dimension control difficulties in some instances. Thus, polyethylene compositions of embodiments exhibiting lower Mz/Mw (e.g., less than 6, or less than 5, less than 4.5, less than 4, or less than 3.5) combined with Mw/Mn of at least 4.0 or at least 4.5, such as at least 5.0, 5.1, or 5.2, may exhibit superior processability. Thus, in some embodiments, polyethylene compositions may have Mz/Mw of less than 5, less than 4.5, less than 4, or less than 3.5; and Mw/Mn of at least 4.0, 4.5, 5.0, 5.1, or 5.2.

Furthermore the polyethylene compositions of various embodiments described herein exhibit unimodal distribution with respect to molecular weight of polymer chains, meaning that there is a single distinguishable peak in a molecular weight distribution curve of the composition (as determined using gel permeation chromatography (GPC) or other recognized analytical technique, noting that if there is any conflict between or among analytical techniques, a molecular weight distribution determined by GPC, as described below, shall control). Examples of "unimodal" molecular weight distribution can be seen in U.S. Pat. No. 8,691,715, FIG. 6 of such patent, which is incorporated herein by reference. This is in contrast with a "multimodal" molecular weight distribution, which means that there are at least two distinguishable peaks in a molecular weight distribution curve (again, as determined by GPC or any other recognized analytical technique, with GPC controlling in the event of any conflict). For example, if there are two distinguishable peaks in the molecular weight distribution curve such composition may be referred to as bimodal composition. For example, in the '715 patent, FIGS. 1-5 of that patent illustrate representative bimodal molecular weight distribution curves. In these figures, there is a valley between the peaks, and the peaks can be separated or deconvoluted. See also FIG. 2 herein for an example of molecular weight distribution of example polyethylene composition embodiments (IE1 and IE2) in accordance with the present disclosure, as well as comparative PE compositions CE1 through CE6, wherein the distribution of each of the foregoing exhibits a single discernable peak for those example compositions (although it is noted that comparative example CE4 has an additional component illustrated as a shoulder along the right-side of its molecular weight distribution by GPC).

The distribution and the moments of molecular weight (Mw, Mn, Mz, Mw/Mn, Mz/Mn, etc.) and the monomer/comonomer content ($C_2$, $C_4$, $C_6$ and/or $C_8$, and/or others, etc.) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 μm Mixed-B LS columns are used to provide polymer separation. Detailed analytical principles and methods for molecular weight determinations are described in paragraphs [0044]-[0051] of PCT Publication WO2019/246069A1, which are herein incorporated by reference (noting that the equation c=/// referenced in Paragraph [0044] therein for concentration (c) at each point in the chromatogram, is c=βI, where β is mass constant and I is the baseline-subtracted IR5 broadband signal intensity (I)). Unless specifically mentioned, all the molecular weight moments used or mentioned in the present disclosure are determined according to the conventional molecular weight (IR molecular weight) determination methods (e.g., as referenced in Paragraphs [0044]-[0045] of the just-noted publication), noting that for the equation in such Paragraph [0044], α=0.695 and K=0.000579(1-0.75 Wt) are used, where Wt is the weight fraction for comonomer, and further noting that comonomer composition is determined by the ratio of the IR5 detector intensity corresponding to $CH_2$ and $CH_3$ channel calibrated with a series of PE and PP homo/copolymer standards whose nominal values are predetermined by NMR or FTIR (providing methyls per 1000 total carbons ($CH_3$/1000 TC)) as noted in Paragraph [0045] of the just-noted PCT publication). Other parameters needed can be found in the referenced passage in the WO2019/246069A1 publication, but some are included here for convenience: n=1.500 for TCB at 145° C.; I=665 nm; dn/dc=0.1048 ml/mg.

Composition Distribution

As noted, polyethylene compositions of the present disclosure exhibit BOCD characteristics. Several methods can illustrate the high degree of preferential comonomer incorporation along the high molecular-weight chains of the polyethylene composition. Of particular interest are methods identifying differences in comonomer wt % between high- and low-molecular weight polymer chains, and/or differences in short chain branch content (SCB), noting that in some embodiments SCB is expressed as number of branches per 1000 total carbon.

Figure 2A:
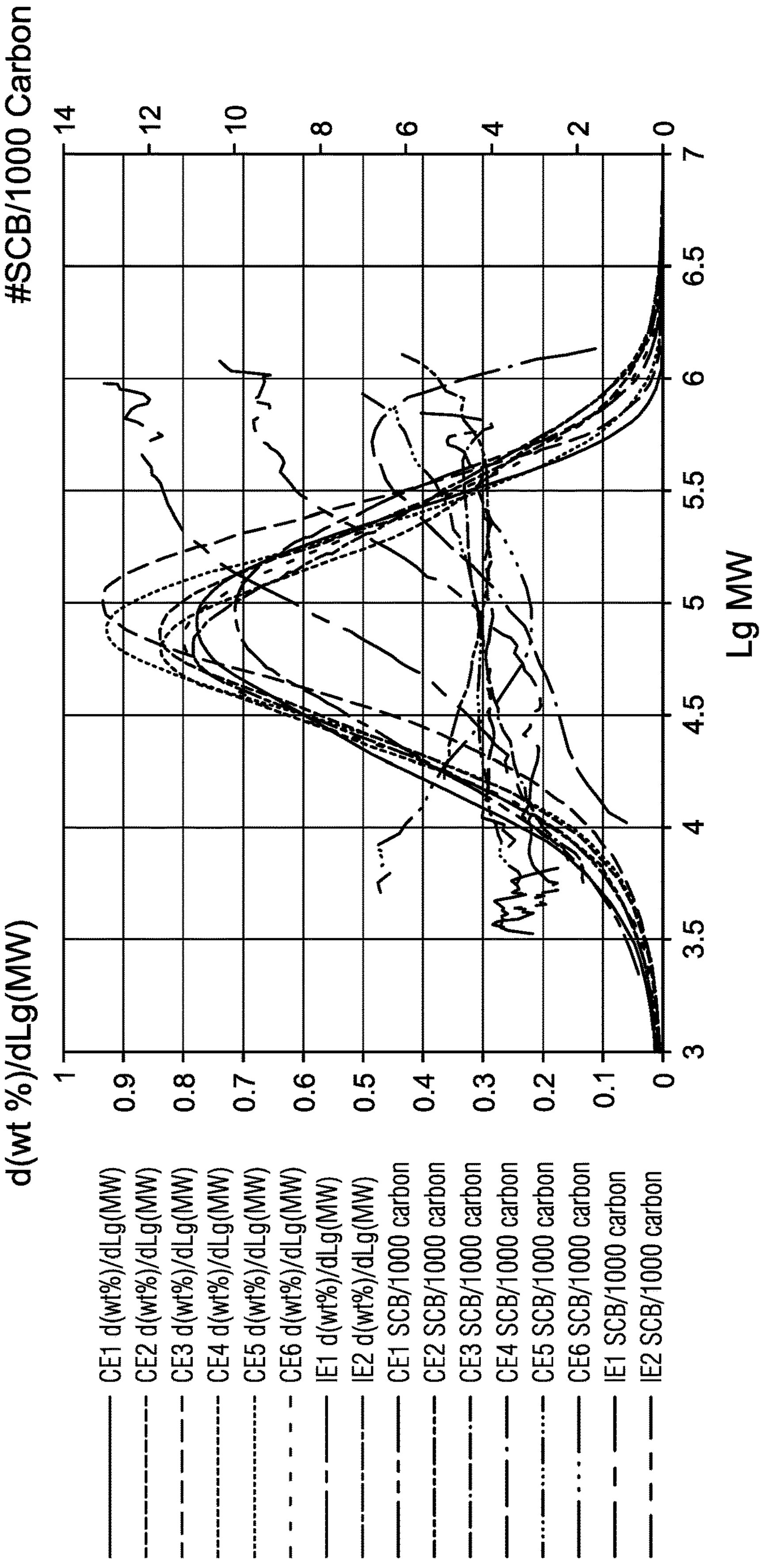
FIG. 2*a* is a plot of molecular weight distributions and short chain branching content per 1000 carbon atoms (SCB/1000 C), determined by gel permeation chromatography (GPC), of polyethylene compositions in accordance with the present disclosure as well as other comparative polyethylene compositions.
Figure 2B:
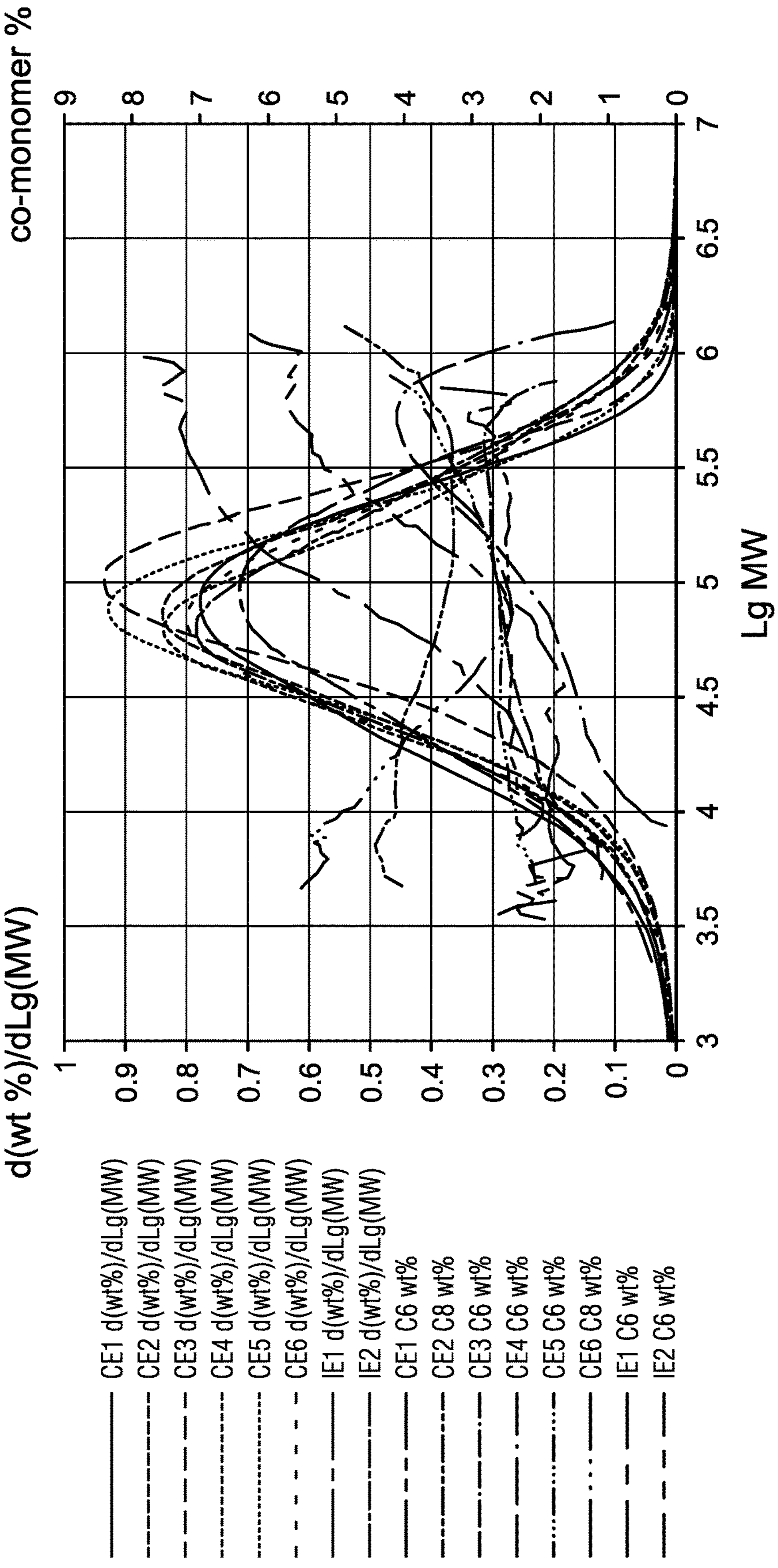
FIG. 2*b* is a GPC plot of molecular weight distributions and comonomer wt % of polyethylene compositions in accordance with the present disclosure as well as other comparative polyethylene compositions.

For instance, polyethylene compositions of various embodiments may have a steep slope of comonomer incorporation as a function of Log(Mw) (the log-scale plot of molecular weights of polymer chains found in the polyethylene composition by GPC analysis as detailed above). See FIG. 2*a*, a plot of (1) molecular weight distribution (dWt/d Log(MW)), on left y-axis) and (2) #SCB/1000C (right y-axis) vs. Log(MW). The plots of SCB/1000 C (#SCB) of IE1 and IE2 (polyethylene compositions in accordance with the present disclosure) exhibit significantly steeper slope than the plots of SCB/1000 C (#SCB) in comparative examples CE1-CE6, illustrating the extreme preference in comonomer incorporation in high-molecular-weight chains of polyethylene compositions of the present disclosure. It is also noted that the comonomer incorporation can be measured in either of two ways. First, as shown in FIG. 2*a*, the SCB/1000 C vs. log(MW). Second, the phenomenon can equivalently be expressed by converting SCB/1000 C (number of short chain branches per 1000 carbons) to wt % comonomer, as illustrated in FIG. 2*b*. For 1-hexene comonomers, this conversion is carried out as: SCB/1000 C=(comonomer wt fraction)*14,000/84, or SCB/1000 C=(comonomer wt %)*140/84 (dividing by 100 when putting comonomer content in terms of wt % rather than wt fraction). This simplifies to SCB/1000C=(comonomer wt %)*1.67, or (SCB/1000C)/1.67=comonomer wt %. This is in recognition that the SCB/1000 C expression is in terms of number of hexene branches per 1000 carbon atoms, rather than a wt % of hexene comonomer (short-chain weight %) and wt % of ethylene backbone. The ordinarily skilled artisan will readily recognize similar conversions for comonomers of different molecular weight (e.g., 1-butene, 1-octene, etc.). For instance, for 1-octene comonomers, the conversion is SCB/1000C=(comonomer wt %)*140/112, which simplifies to SCB/1000C=(comonomer wt %)*1.25.

Putting this overall comonomer incorporation phenomenon in quantitative terms, polyethylene compositions of various embodiments may have composition distribution such that the slope of a linear regression of SCB/1000 C ("#SCB") vs. Log(MW) on a GPC plot obeys the following relationship: for 4.5≤log(MW)≤5.5, slope of the linear regression of #SCB vs. log(MW) is greater than 5, such as greater than or equal to 5.5, greater than or equal to 6, or greater than or equal to 6.5. Put in other words, on a linear regression of SCB/1000C (#SCB) vs. log(MW) as determined by GPC, $$\frac{[\#SCB_{5.5} - \#SCB_{4.5}]}{5.5 - 4.5} > 5,$$

such as ≥5.5, ≥6.0, or ≥6.5, where $\#SCB_x$ values are the #SCB values at the designated log(MW) value of the x-axis (e.g., $\#SCB_{4.5}$ is the #SCB value at x=log(MW)=4.5 on the GPC plot), and the bracketed term [$\#SCB_{5.5}$-$\#SCB_{4.5}$] represents the linear regression of the #SCB plot for 4.5≤Log(MW)≤5.5.

The foregoing parameter (slope of linear regression of #SCB vs. Log(MW)) in the region 4.5≤log(MW)≤5.5 is of particular interest, and may be referred to herein by the shorthand "SCB-Slope Index." Polyethylene compositions according to particular embodiments may exhibit SCB-Slope Index of 5 or more, preferably greater than 5, preferably 6 or more, such as within the range from a low of any one of 5.0, 5.1, 5.2, 5.3, 5.4, 5.5, 5.6, 5.7, 5.8, 5.9, 6.0, 6.1, 6.2, 6.3, 6.4, or 6.5 to a high of any one of 8.0, 8.5, 9.0, 9.5, 10.0, or higher in some cases, with ranges from any foregoing low end to any foregoing high end also contemplated (e.g., 5 or 5.5 to 10, such as 6 to 10 or 6 to 9.5, or even 6 to 8.0 or 9.0). According to certain embodiments, no upper limit of SCB-Slope Index is necessarily contemplated, such that SCB-Slope Index is 6.1 or more, or 6.3 or more, such as 6.5 or more, or 7.0 or more.

Alternatively or in addition, the BOCD nature can be put in broader terms. For instance, the SCB content (#SCB, that is, SCB/1000 C) at the high molecular weight chains of the polymer composition can be compared to #SCB at low molecular weight chains of the polymer composition. For instance, a "15-85 Comonomer Slope Index" may be developed, in which one compares #SCB at two x-values in a GPC plot of dWt %/d log(MW) vs. log(MW): (1) at the "15% value", which is the x-value (log(MW) value) at which area under the GPC curve (from x=0 to x=the 15% value) is 15% of the total area under the GPC curve; and (2) at the "85% value", which is the x-value (log(MW) value) at which area under the GPC curve (from x=0 to x=the "85%" value) is 85% of the total area under the GPC curve. The 15-85 Comonomer Slope index can be found as the slope of the linear regression of #SCB vs. log(MW) between these two points (essentially, the exercise is the same as described above with respect to 4.5≤log(MW)≤5.5, only log(MW)=4.5 is replaced with log(MW)=the 15% value; and log(MW)=5.5 is replaced with log(MW)=the 85% value). Put in these terms, polyethylene compositions according to various embodiments may exhibit a 15-85 Comonomer Slope Index of greater than 4.0, greater than 4.5, or greater than 5, such as within the range from a low of 4.6, 4.7, 4.8, 4.9, 5.0, 5.1, 5.5, 6.0, 6.5, or even 7.0 to a high end of any one of 8.0, 8.5, 9.0, 9.5, 10.0, 10.5, or 11.0 (with ranges from any foregoing low end to any foregoing high end also contemplated). As with SCB-Slope Index, in some embodiments, no upper limit of 15-85 Comonomer Slope Index is necessarily contemplated.

Similarly, an "Mn-Mz Comonomer Slope Index" may be defined and utilized. The index is determined the same as the 15-85 Comonomer Slope Index, except that instead of using log MW="the 15% value" and log MW="the 85% value" as the low and high points of the slope determination, one uses log MW=log Mn as the low point and log MW=log Mz as the high point for slope determination (again using linear regression in the same manner as described above for SCB-Slope Index and 15-85 Slope Index). Put in these terms, polyethylene compositions of various embodiments may exhibit Mn-Mz Comonomer Slope Index of greater than 5, preferably greater than 5.2, such as within the range from a low end of any one of 5.1, 5.2, 5.3, 5.4, or 5.5 to a high end of any one of 8.0, 8.5, 9.0, 9.5, 10.0, 10.5, or 11.0 (with ranges from any foregoing low end to any foregoing high end also contemplated). And, as with SCB-Slope Index and 15-85 Comonomer Slope Index, in some embodiments, no upper limit to Mn-Mz Comonomer Slope Index is necessarily contemplated. Further, for purposes of this calculation, Mz and Mn are determined in the same manner as set forth above for Mz and Mn of polyethylene compositions (e.g., per paragraphs [0044]-[0051] of PCT Publication WO2019/246069A).

Linear regression of the #SCB vs. log(MW) plot, whether for SCB-Slope Index, 15-85 Comonomer Slope Index, or Mz-Mz Comonomer Slope Index, may be carried out by any suitable method, such as linear regression fit of number of SCB vs. Lg(MW) by using suitable software, such as EXCEL™ from Microsoft. Linear regression should be carried out with a minimum of 30 data points for #SCB vs. Log(MW) (or comonomer wt % vs. Log(MW), preferably greater than or equal to 100 data points.

Another parameter useful for demonstrating the BOCD nature of the present polyethylene compositions is reversed comonomer incorporation index (RCI), which may be put in terms of moles or weight of comonomer incorporation. For instance, polyethylene compositions according to various embodiments may also have mole-based reversed comonomer incorporation index (RCI,m) within the range from 60 to 100, such as from a low of any one of 60, 65, or 70 to a high of 80, 85, 90, 95, or 100, with ranges from any foregoing low end to any foregoing high end contemplated herein (e.g., 60 to 90, such as 65 to 85 or 70 to 85). RCI,m is determined according to the method described in Paragraphs [0052]-[0056] in the aforementioned PCT Publication WO2019/246069A1, which description is incorporated herein by reference. Note that W' as used in the calculation of RCI,m (in Paragraph [0055]) is the molecular weight distribution W(z) modified to W'(z) per the description of Paragraph [0053].

Cross-Fractionation Chromatography

Co-monomer distribution is analyzed using cross-fractionation chromatography (CFC), carried out using a CFC-2 instrument from Polymer Char, S.A., Valencia, Spain. The principles of CFC analysis and description for the methodology are found in WIPO Publication WO2019/246069A1, at paragraphs [0074]-[0079], with reference to FIGS. 1A and 1B in that publication; the foregoing passages and figures are incorporated herein by reference for purposes of describing the CFC methodology and parameters obtained therefrom. For instance, the WO2019/246069A1 publication describes how to obtain values for each eluting fraction of the polymer composition in the CFC analysis, where each fraction may be listed by its fractionation temperature (Ti), the corresponding normalized weight % (Wi) of portions of the polymer composition eluting at such temperature, the cumulative weight % of the polymer composition, and various moments of molecular weight averages (including weight average molecular weight, Mwi). From this data, as described in the referenced publication, the temperature at which 100% of the polymer composition has eluted, as well as the closest point at which 50% of the polymer composition has eluted, is determined by the integral, which is used to then divide the fractionations into a first half and a second half. Paragraph [0078] of the referenced WO2019/246069A1 publication walks through an example of dividing the fractionations into a first half and a second half. Once the fractionations are divided into first and second (roughly equal) halves, weight-average elution temperature Tw and weight-average molecular weight Mw of eluting polymer chains for each half (i.e., $Tw_1$ and $Mw_1$ for the first half, $Tw_2$ and $Mw_2$ for the second half) are calculated according to the conventional definition of weight average. Namely, within each half, elution temperature for each eluting fraction Ti and weight of each eluted chain Wi are used to calculate the weight average elution temperature for each half using the formula shown in Eqn. 1 below (also Eqn. 1 in WO2019/246069A1):

$$Tw = \frac{\sum T_i W_i}{\sum W_i} \quad \text{Eqn. 1}$$

where Ti represents the elution temperature for each eluted fraction, and Wi represents the normalized weight % (polymer amount) of each eluted fraction. A weight-average elution temperature Tw can be calculated for each half (e.g., Tw1 for first half and Tw2 for second half). Similarly, Eqn. 2 below (also Eqn. 2 in WO2019/246069A1) shows how to determine weight-average molecular weight of each half (labeled as Mw generally, but for first half would be Mw1 and for second half Mw2), based on the weight-average molecular weight of each eluted fraction i ($Mw_i$):

$$Mw = \frac{\sum Mw_i W_i}{\sum W_i} \quad \text{Eqn. 2}$$

where Mw represents the weight average molecular weight of the specified half (again, with $1^{st}$ half Mw being Mw1 and $2^{nd}$ half Mw being Mw2), $Mw_i$ is the weight-average molecular weight of each eluted fraction, and Wi represents the normalized weight % (polymer amount) of each eluted fraction. Fractions that do not have sufficient quantity (i.e., <0.5 wt %) to be processed for molecular weight averages in the original data file obtained in the CFC procedure are excluded from the calculation of $Tw_1$, $Tw_2$, $Mw_1$, and $Mw_2$.

As discussed in WIPO Publication WO2019/027587 at Paragraphs [0085]-[0087] and [0198] and with reference to FIG. 2 of that publication (which description and figure are incorporated herein by reference), CFC data of Tw1, Tw2, Mw1, and Mw2 can be used to characterize the degree of BOCD character exhibited by a polymer composition. In particular, with reference to FIG. 2 of WO2019/027598, one can see that values of Mw1/Mw2 greater than 1.0 (i.e., where Mw value of the $1^{st}$ half fractionation (Mw1) is greater than Mw value of the $2^{nd}$ half (Mw2), divided per the above procedure), along with increasingly negative value of Tw1-Tw2 indicates greater BOCD character. On the other hand, one can see Mw1/Mw2 less than 1.0, with increasingly negative value of Tw1-Tw2, is consistent with the distribution one would expect for conventional Ziegler-Natta catalyzed polymers (e.g., where comonomer incorporation is preferential in the lower molecular weight chains, rather than the higher-molecular weight chains).

In polyethylene compositions in accordance with the present disclosure, Tw1-Tw2 values are preferably within the range from a "low" (in terms of magnitude of temperature differential) end of −5, −10, or −12° C., to a "high" of −18, −20, −25, or −30° C., such as within the range from −5 to −30° C. or −10 to −20° C., such as −12 to −18° C. (with ranges from any foregoing "low" end to any foregoing "high" end also contemplated). Furthermore, the ratio Mw1/Mw2 is preferably within the range from 1.1 to 3.0, such as within the range from 1.2 to 2.0 or 1.3 to 1.7, with ranges from any foregoing low end to any foregoing high end also contemplated (e.g., from 1.1 to 1.7).

Other Rheological Properties

In various embodiments, the polyethylene compositions have melt index, (MI, also referred to as $I_2$ or $I_{2.16}$ in recognition of the 2.16 kg loading used in the test) within the range from 0.1 g/10 min to 5 g/10 min, such as from a low of any one of 0.1, 0.2, 0.3, 0.4 g/10 min, to a high of 0.5, 0.55, 0.60, 0.65, 0.70, 0.75, 1.0, 1.2, 1.5, 1.7, 2.0, 3.0, 4.0, 5.0, or 10.0 g/10 min, with ranges from any of the foregoing low ends to any of the foregoing high ends contemplated herein) (e.g., 0.1 to 1.0 g/10 min, such as 0.3 to 0.7 g/10 min, or 0.4 to 0.6 g/10 min). Moreover, polyethylene compositions of various embodiments can have a high load melt index (HLMI) (also referred to as $I_{21}$ or $I_{21.6}$ in recognition of the 21.6 kg loading used in the test) within the range from a low of 10, 11, 12, or 13 g/10 min to a high of 15, 16, 17, 18, 19, 20, 25, 30, or 35 g/10 min; with ranges from any of the foregoing lows to any of the foregoing highs contemplated herein (e.g., 10 to 35 g/10 min, such as 10 to 20 g/10 min, or 11 to 17 g/10 min).

Polyethylene compositions according to various embodiments may have a melt index ratio (MIR, defined as $I_{21.6}/I_{2.16}$) within the range from a low of any one of 15, 20, 21, 22, 23, 24, 25, or 26; to a high of any one of 29, 30, 31, 32, 33, 34, 35, 40, 45, or 50, with ranges from any of the foregoing lows to any of the foregoing highs contemplated herein (e.g., 20 to 35, such as 25 to 35, or 25 to 30). Alternatively, MIR may be less than or equal to 50, 45, 40, or 35.

Melt index (2.16 kg) and high-load melt index (HLMI, 21.6 kg) values can be determined according to ASTM D1238-13 procedure B, such as by using a Gottfert MI-2 series melt flow indexer. For MI, HLMI, and MIR values reported herein, testing conditions were set at 190° C. and 2.16 kg (MI) and 21.6 kg (HMLI) load.

In particular embodiments, the polyethylene composition may be characterized by a combination of rheological and microstructural parameters—in particular, by the ratio of its MIR (rheological) to its Mw/Mn (microstructural) as determined by GPC. Both the MIR and Mw/Mn values provide information about the molecular weight distribution of the polymer chains that make up the polymer composition. However, MIR tends to be more sensitive to features of the polymer chains that impact the composition's rheology; Mw and Mn as determined by GPC, on the other hand, are not so sensitive to rheological features of the polymer chains. So, when the two provide substantially different answers, e.g., in the case of a higher ratio of MIR to Mw/Mn, one can infer a greater degree of long-chain branching or similar structural features of the polymer chains that would impact rheology, but not necessarily molecular weight distribution. On the other hand, a lower MIR to Mw/Mn ratio would indicate lesser degree of long-chain branching and/or other structural features of the polymer chains that would impact rheology. Accordingly, polyethylene compositions of various embodiments herein may have ratio MIR/(Mw/Mn) less than 6.0, preferably less than 5.0, more preferably 4.9 or less, or even 4.8 or less. Alternatively, MIR/(Mw/Mn) may be within the range from a low of 3.5, 3.7, 4.0, 4.1, 4.2, 4.3, or 4.4 to a high of 4.6, 4.7, 4.8, or 4.9, with ranges from any foregoing low end to any foregoing high end contemplated (e.g., 4.2 to 4.9, such as 4.3 to 4.8).

Figure 3:
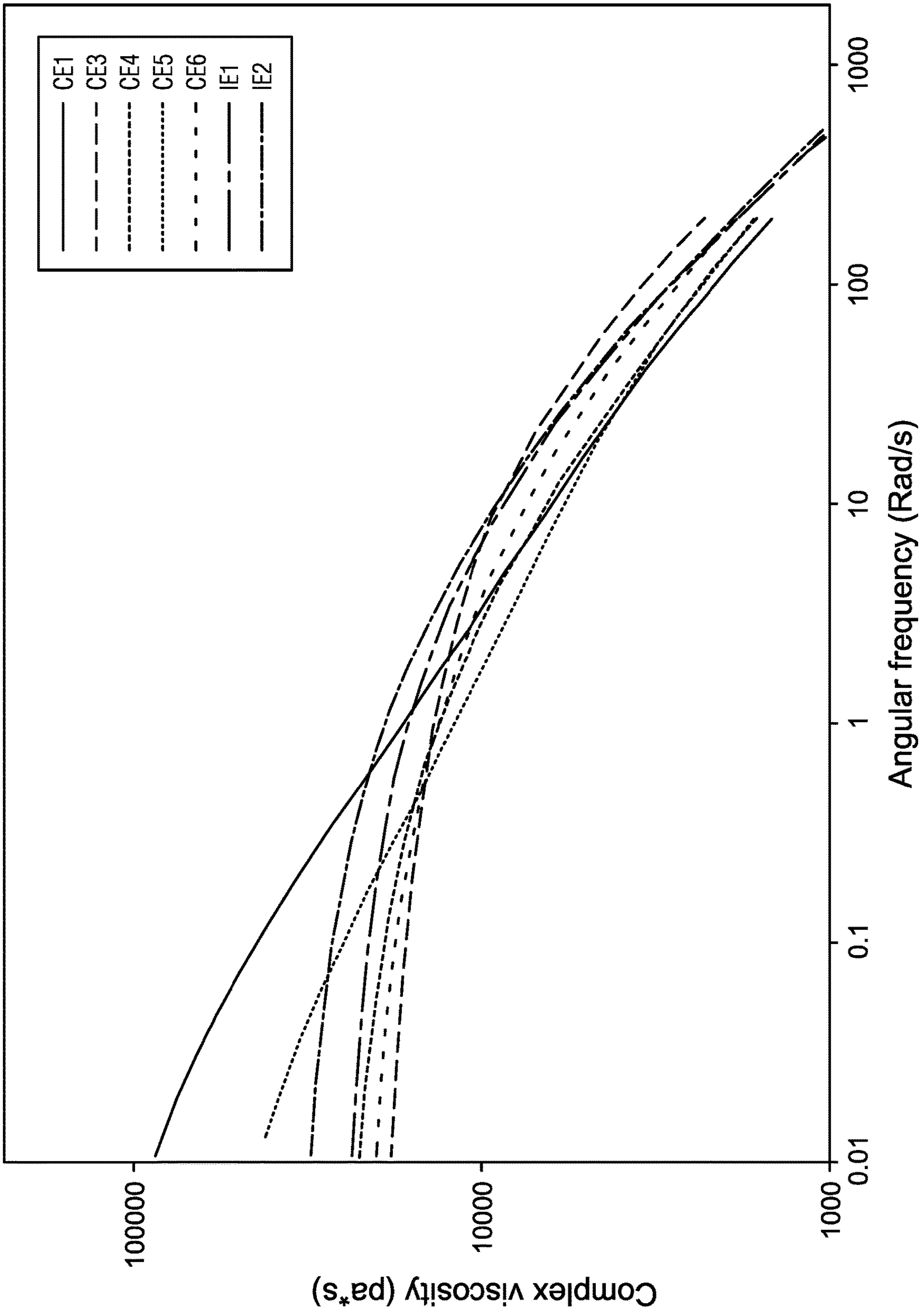
FIG. 3 is a plot of complex viscosity vs. angular frequency for polyethylene compositions in accordance with the present disclosure as well as other comparative polyethylene compositions.

Furthermore, in various embodiments, the polyethylene composition exhibits shear-thinning rheology, meaning that for increasing shear rates, viscosity decreases. This rheology indicates good processability for the polyethylene compositions in accordance with such embodiments (insofar as the shear rates simulate the viscosity that the composition may exhibit when processed in extruders or similar equipment). FIG. 3 is a graph showing complex viscosity (Pa*s) versus shear rate (angular frequency in rad/s) on a log scale, for inventive polyethylene compositions IE1 and IE2 in accordance with the present description; and also for various comparative resins. As discussed below with more details regarding the examples, the inventive resins show desired shear-thinning very similar to comparative resins, showing that the improved strength properties resulting from the highly BOCD nature of the present polyethylene compositions can be achieved without sacrificing processability.

Put quantitatively, a polyethylene composition according to various embodiments may exhibit one or more, preferably two or more, or even all, of the following rheological properties:

- Degree of shear thinning, DST, within the range from 0.6 to 0.98, such as 0.65 to 0.95, with ranges from any foregoing low to any foregoing high contemplated herein. DST is a measure of shear-thinning rheological behavior (decreasing viscosity with increasing shear rate), defined as DST=[η*(0.01 rad/s)−η*(100 rad/s)]/η*(0.01 rad/s), where η*(0.01 rad/s) and η*(100 rad/s) are the complex viscosities at 0.01 and 100 rad/s, respectively.
- Complex viscosity (at 628 rad/s, 170° C.) of 400 to 1,400 Pa*s, such as within the range from 600 to 1,000 Pa*s.
- Complex viscosity (at 100 rad/s, 170° C.) of 2,000 to 4,000 Pa*s, such as 2,400 to 3,100 Pa*s.
- Complex viscosity (at 0.01 rad/s, 170° C.) of 15,000 to 45,000 Pa*s, such as 20,000 to 35,000 Pa*s.

Rheological data such as complex viscosity was determined using SAOS (small amplitude oscillatory shear) testing. SAOS experiments were performed at 170° C. using a 25 mm parallel plate configuration on an ARES-G2 (TA Instruments). Sample test disks (25 mm diameter, 2 mm thickness) were made with a Carver Laboratory press at 170° C. Samples were allowed to sit without pressure for approximately 3 minutes in order to melt and then held under pressure typically for 3 minutes to compression mold the sample. The disk sample was first equilibrated at 170° C. for about 10 minutes between the parallel plates in the rheometer to erase any prior thermal and crystallization history. An angular frequency sweep was next performed with a typical measurement gap of 1.5 mm from 628 rad/s to 0.01 rad/s angular frequency using 5 points/decade and a strain value within the linear viscoelastic region determined from strain sweep experiments (see C. W. Macosko, Rheology Principles, Measurements and Applications, Wiley-VCH, New York, 1994). All experiments were performed in a nitrogen atmosphere to minimize any degradation of the sample during the rheological testing.

In order to quantify the shear thinning rheological behavior, which is defined as the decrease of the viscosity at the increase of frequency or shear rate, we defined the degree of shear thinning (DST) parameter. The DST was measured by the following expression:

$$DST=[\eta^*(0.01\text{ rad/s})-\eta^*(100\text{ rad/s})]/\eta^*(0.01\text{ rad/s})$$

where η*(0.01 rad/s) and η*(100 rad/s) are the complex viscosities at 0.01 and 100 rad/s, respectively.

Other Physical Properties

As discussed previously, polyethylene compositions in accordance with various embodiments described herein exhibit highly advantaged physical properties, allowing for an excellent balance of flexibility associated with MDPE compositions, while maintaining good strength properties.

Accordingly, polyethylene compositions of various embodiments may exhibit any one or more of the following properties:

- Yield Strength within the range from 15 to 25 MPa, such as 16 to 20 MPa. Yield strength is determined by ASTM D638.
- Tensile Strength within the range from 35 to 50, such as from 38 to 45 or 39 to 42 MPa (with ranges from any foregoing low end to any foregoing high end contemplated, e.g., 38 to 42 MPa). Tensile strength is determined according to ASTM D638 using a type IV tensile bar, which can be compression molded per ASTM D4703 and die cut.
- 1% Secant modulus within the range from a low end of 500, 600, 610, or 620 MPa to a high end of 750, 775, 800, 825, 850, 900, 950, or 1000 MPa (with ranges from any foregoing low end to any foregoing high end contemplated, e.g., 600 to 800 MPa). The secant modulus is the ratio of stress to corresponding strain at any selected point on the stress-strain curve, that is, the slope of the straight line that joins the origin and a selected point on the actual stress-strain curve. The 1% secant modulus is calculated at 1% tensile strain using the formula: Secant Modulus=(σ2−σ1)/(ε2−ε1)=(Stress @1% Strain−0)/(1% Strain−0), noting that tensile stress a and tensile strain ε are per ASTM D638.
- Modulus Index within the range from a low of 100, 105, 110, or 115 to a high of 125, 130, 135, 140, 145, or 150 (with ranges from any foregoing low end to any foregoing high end contemplated, e.g., 115 to 130). Modulus index is used herein to characterize the secant modulus of polyethylene compositions according to some embodiments, while normalizing for melt index ($I_{2.16}$ and MIR, $I_{21.6}/I_{2.16}$) and density parameters, and was derived my multi-variable regression analysis on resins in accordance with such embodiments, resulting in the following characteristic relationship:

$$\text{Modulus Index} = \frac{[1\%\text{ secant modulus}]\times 100}{(142.69 * MI) + (2.145 * MIR) + (21{,}719.25 * \rho) - 19{,}822.2}$$

- The MI and MIR are measured by following ASTM D1238 (190° C.) and density (p) is measured by ASTM D1505. The values are used in the above equation to determine modulus index.
- Elongation at Yield within the range from a low of 10, 11, or 12% to a high of 13, 14, 15, 17, or 20% (with ranges from any foregoing low end to any foregoing high end contemplated, e.g., 10 to 20% or 12 to 15%). Alternatively, elongation at yield may be greater than or equal to 12%, 13%, 14%, or 15%; or, in other embodiments, elongation at yield may be greater than 12%, 13%, 14%, or 15%. Elongation at yield is determined by ASTM D638.
- Stress Crack Resistance as measured by Notched Constant Tensile Load (this property may be referred to using the shorthand "NCTL") of greater than 1200 hours, preferably greater than any one of 1300, 1350, 1400, or 1450 hours, or more preferably even greater than 1500 hours, such as greater than 1550, 1600, 1650, or 1700 hours. The single point Notched Constant Tensile Load (NCTL) test is performed per ASTM D5397, wherein the sheet is prepared by compressional molding per ASTM D4703; but instead of using 30% of the yield strength of a sample, 800 psi stress is used for a sample for simplicity and ease of comparability between samples.

Methods of Making Polyethylene Compositions

In embodiments herein, the invention relates to polymerization processes where monomer (such as ethylene), and optionally comonomer (e.g., any of the above-described comonomers), are contacted with a catalyst system comprising at least one activator, at least one support and at least one catalyst, such as a metallocene compound. Catalyst systems are described in more detail below. The support, catalyst compound, and activator may be combined in any order, and are combined typically prior to contacting with the monomers.

Polymerization processes according to the present disclosure can be carried out in any manner known in the art. Any suspension, slurry, high pressure tubular or autoclave process, or gas phase polymerization process known in the art can be used under polymerizable conditions. Such processes can be run in a batch, semi-batch, or continuous mode. Heterogeneous polymerization processes (such as gas phase and slurry phase processes) are useful. A heterogeneous process is defined to be a process where the catalyst system is not soluble in the reaction media. Alternatively, in other embodiments, the polymerization process is not homogeneous.

In various embodiments, polymerization processes as described generally in paragraphs [0104]-[0114] of WIPO Publication WO2019/083609, which description is incorporated by reference herein, may be suitable (e.g., gas-phase or slurry-phase processes as described therein).

In particular embodiments, the polymerization is performed in the gas phase, in particular in a gas-phase fluidized bed reactor system in accordance with the general description of Paragraphs [0172]-[0178] and FIG. 2 of US Patent Publication US2020/0071437, which description and figure are incorporated by reference herein. Furthermore, a catalyst system comprising two catalyst compositions (as described below) may be used, and delivered to the fluidized bed reactor as a catalyst component solution and catalyst component slurry combined and delivered as described in the systems and processes in US2020/0071437, Paragraphs [0145]-[0171] and FIGS. 2 and 3, which description is also incorporated herein by reference.

In particular embodiments herein, the polymerization to obtain the polyethylene composition takes place in a single reactor, or in multiple parallel reactors with post-reactor blending, as opposed to taking place in multiple series reactors. However, it is also contemplated that the polyethylene composition could, in other embodiments, be formed in multiple (two or more) series reactors.

In addition, some or all of the polymerization conditions as described in US2020/0071437 may be altered, or further specified, in order to produce polyethylene compositions in accordance with the present disclosure. For instance, according to various embodiments herein, polymerization conditions may include any one or more of the conditions described below. In particular, it is noted that it was surprising to be able to modify reactor conditions in order to produce specifically MDPE with densities and/or comonomer contents in accordance with the present disclosure, and still achieve such extreme BOCD features. One would typically expect a flatter comonomer distribution when reducing comonomer contents in order to achieve higher density. Accordingly, reaction conditions may in various embodiments include one or more of:

- Hydrogen concentration (e.g., for molecular weight control of the polyethylene composition's polymer chains) in the range from a low of any one of 50, 60, 70, and 80 ppm to a high of any one of 200, 250, 300, 350, 400, 450, or 500 ppm, with ranges from any foregoing low to any foregoing high contemplated (e.g., 50 to 500 ppm, such as from 80 to 200 ppm). Hydrogen concentration is determined on the basis of moles hydrogen per moles of total gas in the reactor, which for convenience, may in the case of a gas phase polyethylene reactor with a cycle gas outlet (see US Patent Publication US2020/0071437, or the '437 Publication), be measured as hydrogen concentration (mol-ppm) in the cycle gas outlet (e.g., the non-solid components flowed from the reactor outlet and recycled to the reactor, after one or more optional cooling and/or separation steps such as those described in the '437 Publication).
- Ethylene concentration in the range from 35-95 mol %, such as within the range from a low of 35, 40, 45, 50, or 55 mol % to a high of 70, 75, 80, 85, 90, or 95 mol % (with ranges from any foregoing low end to any foregoing high end also contemplated), and further where ethylene mol % is measured on the basis of total moles of gas in the reactor (including, if present, ethylene and/or comonomer gases as well as inert gases such as one or more of nitrogen, isopentane or other ICA(s), etc.); as with vol-ppm hydrogen, this measurement may for convenience be taken in the cycle gas outlet rather than in the reactor itself.
- Comonomer concentration in the range from 0.2-1.0 mol %, such as within the range from a low of 0.2, 0.3, 0.4 or 0.5 mol % to a high of 0.65, 0.70, 0.75, 0.80, 0.85, 0.90, 0.95, or 1.0 mol % (with ranges from any foregoing low to any foregoing high contemplated), where comonomer concentration is mol % on basis of total moles of gas in the reactor, again measured for convenience in the cycle gas outlet in the case of gas phase polymerization per the '437 Publication.
- Reactor pressure in the range from 200 to 500 psig, such as within the range from a low of any one of 210, 220, 230, 240, or 250 psig to a high of any one of 350, 375, 400, 425, 450, 475, and 500 psig (with ranges from any foregoing low end to any foregoing high end contemplated);
- Reactor temperature in the range from 60 to 90° C., such as from a low of any one of 60, 65, 70, 75, 76, 77, and 78° C. to a high of any one of 80, 82, 84, 86, 88, and 90° C. (with ranges from any foregoing low end to any foregoing high end contemplated).

Catalyst Systems and Activators

As noted, suitable polymerization processes employ a polymerization catalyst system, and in particular a polymerization catalyst system comprising at least one activator, at least one support and at least one catalyst composition. The catalyst composition is preferably a single-site catalyst, such as a metallocene catalyst. The catalyst system may in particular, but need not necessarily, be delivered in a catalyst trim methodology as noted above and as described in paragraphs [0134]-[0139] of US2020/0071437.

Any suitable polymerization catalyst may be used to obtain the polyethylene compositions as described herein (e.g., Ziegler-Natta, single-site such as metallocene, etc.), but preferred catalyst systems employ a mix of two metallocene catalysts: a bis-cyclopentadienyl hafnocene and a zirconocene, such as an indenyl-cyclopentadienyl zirconocene.

More particularly, the bis-cyclopentadienyl hafnocene may be in accordance with one or more of the following metallocene catalyst compositions according to formulas (A1) and/or (A2) as described in US2020/0071437 and summarized briefly below.

Suitable catalyst compositions include hafnocenes, preferably bis-cyclopentadienyl hafnocenes, such as hafnocenes represented by the formula (A1) as described in Paragraph [0069]-[0086] of US2020/0071437, which description is incorporated herein by reference: $Cp^{A}Cp^{B}M'X'_{n}$ (A1), wherein

- $Cp^{A}$ is a cyclopentadienyl group which may be substituted or unsubstituted, provided that $Cp^{A}$ is substituted with at least one R group, where R is a group containing at least three carbon and/or silicon atoms, preferably R is a $C_3$ to $C_{12}$ alky group, preferably R is a linear $C_3$ to $C_{12}$ alkyl group (such as n-propyl, n-butyl, n-pentyl, n-hexyl, n-heptyl, n-octyl, n-nonyl, n-decyl, n-undecyl or n-dodecyl), and $Cp^{A}$ is optionally also independently substituted by one, two, three, or four R" groups;
- $Cp^{B}$ is a cyclopentadienyl group which may be substituted or unsubstituted, substituted by one, two, three, four, or five R" groups or R** groups;
- M' is Hf;
- each X' is, independently, a univalent anionic ligand, or two X' are joined and bound to the metal atom to form a metallocycle ring, or two X' are joined to form a chelating ligand, a diene ligand, or an alkylidene ligand (preferably each X' is independently, halogen or $C_1$ to $C_{12}$ alkyl or $C_5$ to $C_{12}$ aryl, such as Br, Cl, I, Me, Et, Pr, Bu, Ph);
- n is 0, 1, 2, 3, or 4, preferably n is 2; and
- each R" is independently selected from the group consisting of hydrocarbyl, substituted hydrocarbyl, heteroatom, or heteroatom containing group.

Particular examples of hafnocenes according to formula (A1) include bis(n-propylcyclopentadienyl)hafnium dichloride, bis(n-propylcyclopentadienyl)hafnium dimethyl, (n-propylcyclopentadienyl, pentamethylcyclopentadienyl) hafnium dichloride, (n-propylcyclopentadienyl, pentamethylcyclopentadienyl)hafnium dimethyl, (n-propylcyclopentadienyl, tetramethylcyclopentadienyl)hafnium dichloride, (n-propylcyclopentadienyl, tetramethylcyclopentadienyl) hafnium dimethyl, bis(cyclopentadienyl)hafnium dimethyl, bis(n-butylcyclopentadienyl)hafnium dichloride, bis(n-butylcyclopentadienyl)hafnium dimethyl, and bis(1-methyl-3-n-butylcyclopentadienyl)hafnium dimethyl.

Suitable catalyst compositions also or instead may include hafnocenes represented by formula (A2) as described in Paragraphs [0086]-[0101] of US2020/0071437, which description is also incorporated by reference herein:

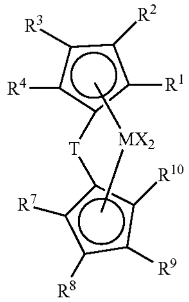

A2 where:

- M is Hafnium;
- each $R^1$, $R^2$, and $R^4$ is independently hydrogen, alkoxide, or a $C_1$ to $C_{40}$ substituted or unsubstituted hydrocarbyl group (preferably a $C_1$ to $C_{20}$ substituted or unsubstituted hydrocarbyl group);
- $R^3$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group), or is $—R^{20}—SiR'_3$ or $—R^{20}—CR'_3$ where $R^{20}$ is a $C_1$ to $C_4$ hydrocarbyl, and each R' is independently hydrogen or a $C_1$ to $C_{20}$ substituted or unsubstituted hydrocarbyl, provided that at least one R' is not H;
- each $R^7$, $R^8$, and $R^{10}$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group);
- $R^9$ is $—R^{20}—SiR'_3$ or $—R^{20}—CR'_3$ where $R^{20}$ is a $C_1$ to $C_4$ hydrocarbyl (preferably $R^{20}$ is $CH_2$), and each R' is independently hydrogen or a $C_1$ to $C_{20}$ substituted or unsubstituted hydrocarbyl, (preferably R' is alkyl, such as Me, or aryl, such as phenyl), provided that at least one R' is not H, alternately 2 R' are not H, alternately 3 R' are not H;
- T is a bridging group, which in some embodiments may be a bridging group represented by the formula $R^{a}_{2}J$ or $(R^{a}_{2}J)_2$, where J is C, Si, or Ge, and each $R^{a}$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^{a}$ can form a cyclic structure including aromatic, partially saturated, or saturated cyclic or fused ring system; and
- each X is, independently, a univalent anionic ligand, or two X are joined and bound to the metal atom to form a metallocycle ring, or two X are joined to form a chelating ligand, a diene ligand, or an alkylidene ligand (preferably halogen or $C_1$ to $C_{12}$ alkyl or aryl, such as Cl, Me, Et, Ph).

The hafnocene according to (A2) may be present in a catalyst composition in rac and meso form as described in Paragraph [0099] of US2020/0071437, e.g., at a ratio of 1:1 to 100:1 ratio of rac to meso, determined per Paragraph [0100] of US2020/0071437.

Hafnocene compounds according to (A2) that are particularly useful include one or more of the compounds listed in Paragraph [0101] of US2020/0071437, also incorporated by reference herein, such as (for a relatively brief example): rac/meso $Me_2Si(Me_3SiCH_2Cp)_2HfMe_2$; $racMe_2Si(Me_3SiCH_2Cp)_2HfMe_2$; rac/meso $Ph_2Si(Me_3SiCH_2Cp)_2HfMe_2$; rac/meso $(CH_2)_3Si(Me_3SiCH_2Cp)_2HfMe_2$; rac/ meso $(CH_2)_4Si(Me_3SiCH_2Cp)_2HfMe_2$; rac/meso $(C_6F_5)_2Si(Me_3SiCH_2Cp)_2HfMe_2$; rac/meso $(CH_2)_3Si(Me_3SiCH_2Cp)_2ZrMe_2$; rac/meso $Me_2Ge(Me_3SiCH_2Cp)_2HfMe_2$; rac/meso $Me_2Si(Me_2PhSiCH_2Cp)_2HfMe_2$; rac/meso $Ph_2Si(Me_2PhSiCH_2Cp)_2HfMe_2$; $Me_2Si(Me_4Cp)(Me_2PhSiCH_2Cp)HfMe_2$; etc.

As noted above, suitable catalyst compositions also or instead may include a zirconocene, such as a zirconocene according to formula (B) as described in Paragraphs [0103]-[0113] of US2020/0071437, which description is also incorporated herein by reference. In particular, the zirconocene may follow $T_yCp_mM^6G_nX^5_q$ (B), where:

- each Cp is, independently, a cyclopentadienyl group (such as cyclopentadiene, indene or fluorene) which may be substituted or unsubstituted, provided that at least one Cp is an indene or fluorene group;
- $M^6$ is a zirconium;
- G is a heteroatom group represented by the formula $JR^*_z$ where J is N, P, O or S, and R* is a $C_1$ to $C_{20}$ hydrocarbyl group and z is 1 or 2;
- T is a bridging group;
- y is 0 or 1;
- $X^5$ is a leaving group (such as a halide, a hydride, an alkyl group, an alkenyl group or an arylalkyl group);
- m is 1 or 2;
- n is 0, 1, 2 or 3;
- q is 0, 1, 2, or 3; and
- the sum of m+n+q is equal to the oxidation state of the transition metal, preferably 4. See, for example, WO 2016/094843.

In certain embodiments, y is 0 and n is 0 in the zirconocene (meaning there is no bridging group or heteroatom "G" group), and suitable zirconocenes may be any one of those listed in Paragraph [0112] of US2020/0071437, e.g.: bis(indenyl)zirconium dichloride, bis(indenyl)zirconium dimethyl, bis(tetrahydro-1-indenyl)zirconium dichloride, bis(tetrahydro-1-indenyl)zirconium dimethyl, rac/meso-bis(1-ethylindenyl)zirconium dichloride, rac/meso-bis(1-ethylindenyl)zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1-butylindenyl)zirconium dimethyl, meso-bis(lethylindenyl) zirconium dichloride, meso-bis(1-ethylindenyl) zirconium dimethyl, (1-methylindenyl)(pentamethyl cyclopentadienyl) zirconium dichloride, (1-methylindenyl)(pentamethyl cyclopentadienyl) zirconium dimethyl, or combinations thereof.

Catalyst systems of particular embodiments herein may include two or more of the above-described metallocene catalyst compositions, and in particular may include (1) a bis-cyclopentadienyl hafnocene and (2) a zirconocene. For instance, catalyst systems of particular of these embodiments may include a bis-cyclopentadienyl hafnocene according to either formula (A1) or (A2), and a zirconocene according to formula (B), in any suitable ratio such as described in Paragraphs [0114]-[0116] of US2020/0071437, incorporated by reference herein. Furthermore, as noted, catalyst systems in general may include one or more activators and support materials. In addition, catalyst systems of various embodiments may further include continuity additives/static control agents.

Trim and Pre-Trim of Catalyst Systems

Furthermore, the catalyst composition can be further modified by incorporation of trim solution in oil during catalyst slurry mixture preparation ("pre-trim") to optimize reactor performance. In other words, according to such embodiments, methods of producing the polyethylene compositions herein may include utilizing a pre-trim catalyst composition, which in turn is combined with further catalyst solution ("trim solution") on an as-needed basis depending on desired reaction conditions. Thus, processes according to some embodiments may include: (a) preparing a pre-trimmed catalyst slurry (or "pretrim slurry") by combining components comprising: (a-1) catalyst particles comprising (i) a bis-cyclopentadienyl hafnocene (e.g., a catalyst composition according to either formula A1 or A2 (which may be referred to by the shorthand forms "Catalyst A1" and "Catalyst A2" respectively)) and (ii) a zirconocene (e.g., a catalyst composition according to formula B (or, "Catalyst B")) on one or more supports (supports are discussed in more detail below); (a-2) an oil (e.g., mineral oil), (a-3) optionally a wax (e.g., SonoJell™ available from Sonneborn); and (a-4) a first solution of unsupported zirconocene (e.g., Catalyst B) in oil (e.g., mineral oil); and (b) forming a trimmed catalyst slurry (or "trim slurry") by combining the pre-trimmed catalyst slurry (or, "pretrim slurry") with a trim solution, the trim solution comprising a second solution of unsupported zirconocene (e.g., Catalyst B) in oil (e.g., mineral oil). The pretrim slurry of (a) may be prepared in advance and stocked, e.g., in a storage tank for feeding to the reactor in a catalyst feed line, while the forming (b) entails in-line blending of the trim solution with the pretrim slurry to form the trimmed catalyst slurry in the catalyst feed line, which in turn is fed to the polymerization reactor as the catalyst system.

By adding a first solution of zirconocene (e.g., Catalyst B) in oil to make the "pretrim" slurry, running a large-scale reactor system for employing the catalyst system in accordance with the present disclosure is made more efficient. This is because an "anchor" ratio of hafnocene and zirconocene (e.g., ratio of Catalyst A to Catalyst B) can be established through preparation of the pretrim slurry (e.g., the anchor ratio may represent the least amount of zirconocene that one would use in a production campaign using a catalyst system as described herein), and the trim solution may then be used to adjust away from, and/or back toward, the anchor ratio, by adding more or less zirconocene according to desired production conditions for a given grade of polyethylene composition within the production campaign. Thus, methods according to some embodiments may include:

(1) at time $t_1$, polymerizing ethylene and optionally one or more α-olefin comonomers using a first trim slurry formed by combining the pretrim slurry with a first amount of trim solution (e.g., a trim solution according to that just described above), to obtain a polyethylene composition $PE_1$;

(2) optionally, at time $t_2$ (where $t_2$ may be after $t_1$), polymerizing additional ethylene and additional α-olefin comonomers using a second trim slurry formed by combining additional portion of the pretrim slurry with a second amount of trim solution, to obtain a second polyethylene composition $PE_2$; and (3) optionally, at time $t_3$ (where $t_3$ may be after $t_1$ and/or $t_2$), polymerizing further ethylene and further α-olefin comonomers using only the pretrim slurry, without adding trim solution, to obtain a third polyethylene composition $PE_3$.

It will be appreciated that the above steps may be performed in a different order. That is, for example, the time $t_3$ may come before $t_1$ and/or $t_2$, reflecting that a "no-trim-solution added" condition may be used at any point in a production campaign, and thereafter (or before) polymerization can take place using a catalyst system formed by combining pretrim slurry and trim solution. Also, in the just-described method, each "trim slurry" (or in the case of the time $t_3$ polymerization, "pretrim slurry") is the catalyst system used for each respective polymerization.

Furthermore, the second amount of trim solution may be the same as the first amount of trim solution, but in some embodiments it is preferably different from the first amount; and in practice the use of processes according to such embodiments enables continuous and/or on-the-fly adjustment of catalyst ratios (e.g., ratio of Catalyst A1 or A2, to Catalyst B) in a production campaign, in order to achieve desired catalyst ratios for production of various different polyethylene compositions (e.g., $PE_0$, $PE_1$, $PE_2$) that are different from one another. While a more conventional trim process may enable such control, the presently-described processes, by using the "anchor ratio" achieved from the pretrim solution, advantageously avoid needless additional mixing of catalyst slurry with catalyst trim solution, particularly where a certain minimum amount of Catalyst B will always be present in the desired catalyst system for any polyethylene composition produced during the production campaign. Furthermore, improvements in reactor operation (throughput, reduced fouling, or the like) may also be expected from the use of a pretrim slurry as just described; whether or not the first and second amounts of pretrim solution are different or the same. Accordingly, one may employ a pretrim process such as those described herein in order to tune polyethylene product properties, tune reactor performance, or both.

Additional permutations and combinations of the just-described pretrim processes are also contemplated, e.g., for various production campaigns in accordance with the present disclosure. For example, the above-described process may further include repeating steps (1) and/or (2) at a time $t_4$ (where $t_4$ is after $t_3$, $t_2$, $t_1$), and so on for further iterations as desired. In yet another embodiment, multiple catalyst pretrim slurries may be formed, each having different ratios of hafnocene (e.g., Catalyst A1 or Catalyst A2) to zirconocene (e.g., Catalyst B), such that two, three, or more tanks of advance-prepared pretrim slurries are contemplated (e.g., such that each tank respectively holds a first, second, third, etc. pretrim slurry, each pretrim slurry having different ratios of hafnocene to zirconocene. The first pretrim slurry can be fed to a polymerization reactor via a catalyst inlet line at time $t_0$, optionally combined in-line with trim solution in the catalyst inlet line, to form a first trim slurry used as a catalyst system to polymerize ethylene and comonomer to form $PE_0$; at a time $t_1$ (after $t_0$), the second pretrim slurry can be fed via the catalyst inlet line, optionally combined in-line with trim solution in the catalyst inlet line to form a second trim slurry used as a catalyst system to polymerize ethylene and comonomer to form $PE_1$; and so on for a third, fourth, etc. pretrim slurry (with selective iteration back to any one of the previously-noted pretrim slurries). In this way, trim solution feed to the catalyst inlet line can in some cases be kept at a continuous (optionally substantially constant) flow, while catalyst ratio adjustment is achieved by selecting a different one of the pretrim slurries to form the trim slurry (catalyst system) for a given polyethylene grade production within the production campaign.

Furthermore, at least one of the polyethylene compositions $PE_1$, $PE_2$, or $PE_3$ in the just-described catalyst trim methods is a polyethylene composition in accordance with the polyethylene compositions described herein. For instance, $PE_1$ may be a polyethylene composition as described herein, such that the polyethylene composition is the first grade made in a production campaign; however, it could just as easily be that $PE_2$ or $PE_3$ is also or instead a polyethylene composition as described herein. In some embodiments, two or more or all of $PE_1$, $PE_2$, and $PE_3$ may be in accordance with the polyethylene compositions described herein.

Activators, Support Materials, Continuity Additives

As noted, catalyst systems may include one or more activators and support materials. In addition, catalyst systems of various embodiments may further include continuity additives/static control agents.

The catalyst compositions, especially supported Catalyst A1/B or Catalyst A2/B in a pretrim slurry as described above, may be combined with activators in any manner in the art including by supporting them for use in slurry or gas phase polymerization. Activators are generally compounds that can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion. For instance, suitable activators include any of the alumoxane activators and/or ionizing/non-coordinating anion activators described in Paragraphs [0118]-[0128] of US2020/0071437, also incorporated herein by reference.

Suitable supports, sometimes also referred to as "carriers," include but are not limited to, active and inactive materials, synthetic or naturally occurring zeolites, as well as inorganic materials such as clays and/or oxides such as silica, alumina, zirconia, titania, silica-alumina, cerium oxide, magnesium oxide, or combinations thereof. In particular, the support may be silica-alumina, alumina and/or a zeolite, particularly alumina. Silica-alumina may be either naturally occurring or in the form of gelatinous precipitates or gels including mixtures of silica and metal oxides.

The catalyst composition may also include any continuity additive/static control agent (a chemical composition which, when introduced into a fluidized bed reactor, may influence or drive the static charge (negatively, positively, or to zero) in the fluidized bed), such as those described in Paragraphs [0140]-[0144] of US2020/0071437, incorporated herein by reference.

Blends with Recycled and Other Polymer Material

In some particular embodiments, a polyethylene composition in accordance with the present disclosure is combined with one or more additional polymer compositions in a blend prior to being formed into a film, molded part, or other article. As used herein, a "blend" may refer to a dry or extruder blend of two or more different polymers, and in-reactor blends, including blends arising from the use of multi or mixed catalyst systems in a single reactor zone, and blends that result from the use of one or more catalysts in one or more reactors under the same or different conditions (e.g., a blend resulting from in series reactors (the same or different) each running under different conditions and/or with different catalysts).

In particular embodiments, additional polymer composition(s) include recycled polymeric materials, such as post-consumer recycled (PCR) and/or post-industrial recycled (PIR) polymer materials. Examples include, e.g., homopolymer PCR (milk bottle resin), or recycled (PCR or PIR) LDPE, HDPE, or MDPE.

In yet further embodiments, blend partners with the present polyethylene compositions can include polyethylene, isotactic polypropylene, highly isotactic polypropylene, syndiotactic polypropylene, random copolymer of propylene and ethylene, and/or butene, and/or hexene, polybutene, ethylene vinyl acetate, low density polyethylene (LDPE), linear low density polyethylene (LLDPE), high density polyethylene (HDPE), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, ethylene propylene diene monomer (EPDM) polymer, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In some embodiments, the additional polymer (whether recycled polymer material or otherwise) is present in the above blends, at from 0.1 to 99 wt %, based upon the weight of the polymers in the blend, such as within the range from a low from any one of 0.1, 0.5, 1, 5, 10, 15, 20, 25, 30, 35, 40, 45, or 50 wt %, to a high of 10, 15, 20, 25, 30, 35, 40, 45, 50, 55, 60, 65, 70 or even 75 wt %, with ranges from any of the foregoing low ends to any of the foregoing high ends contemplated herein, provided the high is greater than the low (e.g., 20 to 55 wt %, 25 to 65 wt %, 45 to 55 wt %, 50 to 75 wt %, 50 to 60 wt %, etc.). The balance of the polymer blend of such embodiments may be a polyethylene composition of the various embodiments as described previously (where the "balance" means that wt % additional polymer+wt % polyethylene composition=100 wt %). In particular embodiments, the additional polymer is recycled polymer material, such as either or both of PCR material and PIR material.

The blends described above may be produced by mixing the polyethylene composition with one or more additional polymers (as described above, and specifically including PCR material), by connecting reactors together in series to make reactor blends or by using more than one catalyst in the same reactor to produce multiple species of polymer. The polymers can be mixed together prior to being put into an extruder or may be mixed in an extruder.

The blends may be formed using conventional equipment and processes, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the molding and/or film extruder.

Additionally, additives (e.g., described in more detail below) may be included in the blend, in one or more components of the blend, and/or in a product formed from the blend, such as a film, as desired. Such additives may include, for example: fillers; antioxidants (e.g., hindered phenolics such as IRGANOX™ 1010 or IRGANOX™ 1076 available from Ciba-Geigy); phosphites (e.g., IRGAFOS™ 168 available from BASF); Acid scavenger; anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Additives

A polyethylene composition (and/or a blend comprising the polyethylene composition) of the present disclosure may include one or more additives. The additives may include reinforcing and non-reinforcing fillers, antioxidants, stabilizers, processing oils (or other solvent(s)), compatibilizing agents, lubricants (e.g., oleamide), antiblocking agents, anti-static agents, waxes, coupling agents for the fillers and/or pigment, pigments (also referred to as colorants), flame retardants, or other processing aids, or combination(s) thereof.

In at least one embodiment, a polyethylene composition may include fillers and/or pigments/colorants (e.g., in an mount from 0.1 to 10 wt %, such as 1 to 7 wt % or 2 to 5 wt %, based on total weight of the polyethylene composition or, as applicable, the blend comprising the polyethylene composition). Exemplary materials include inorganic fillers such as calcium carbonate, clays, silica, talc, titanium dioxide or carbon black. Any suitable type of carbon black can be used, such as channel blacks, furnace blacks, thermal blacks, acetylene black, lamp black and the like.

In at least one embodiment, a polyethylene composition may include flame retardants, such as calcium carbonate, inorganic clays containing water of hydration such as aluminum trihydroxides ("ATH") or magnesium hydroxide.

In at least one embodiment, a polyethylene composition may include UV stabilizers, such as titanium dioxide or Tinuvin® XT-850. The UV stabilizers may be introduced into a roofing composition as part of a masterbatch. For example, UV stabilizer may be pre-blended into a masterbatch with a thermoplastic resin, such as polypropylene, or a polyethylene, such as linear low density polyethylene.

Still other additives may include antioxidant and/or thermal stabilizers. In at least one embodiment, processing and/or field thermal stabilizers may include IRGANOX® B-225 and/or IRGANOX® 1010 available from BASF.

In at least one embodiment, a polyethylene composition may include a polymeric processing additive (e.g., from 0.1 to 20 wt %, based on total weight of the polyethylene composition or, where applicable, total weight of the blend comprising the polyethylene composition). The processing additive may be a polymeric resin that has a very high melt flow index. These polymeric resins can include both linear and/or branched polymers that can have a melt flow rate that is about 500 dg/min or more, such as about 750 dg/min or more, such as about 1000 dg/min or more, such as about 1200 dg/min or more, such as about 1500 dg/min or more. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives can include polypropylene homopolymers, and branched polymeric processing additives can include diene-modified polypropylene polymers. Similar processing additives are disclosed in U.S. Pat. No. 6,451,915, which is incorporated herein by reference.

Articles

A polyethylene composition of the present disclosure (and/or a blend comprising the polyethylene composition) can be useful in forming various articles, including film (monolayer or multilayer, formed by extrusion, co-extrusion, casting, and/or lamination), sheet, and fiber extrusion and co-extrusion; as well as gas-assisted injection molding, extrusion blow molding, injection blow molding, injection stretch blow molding, compression molding, rotational molding, foam molding, thermoforming, sheet extrusion, and profile extrusion. As one example, tubing or pipe may be obtained by profile extrusion of compounds including the polyethylene composition and/or a blend comprising the composition, for uses in medical, potable water, land drainage applications or the like. Tubing or pipe may be unvulcanized or vulcanized. Vulcanization can be performed using, for example, a peroxide or silane during extrusion of the pipe. The profile extrusion process involves the extrusion of molten polymer through a die. The extruded tubing or pipe is then solidified by chill water or cooling air into a continuous extruded article. The various molding, extrusion and other forming processes are well known to those of ordinary skill in the art.

For instance, the enhanced properties of the polyethylene compositions (and/or blends comprising polyethylene compositions) make them suitable for many end-use applications (e.g., of films, molded articles, or the like formed from the composition). Some examples include: transparent articles such as cook and food storage ware, and in other articles such as furniture (e.g., outdoor and/or garden furniture), automotive components, toys, sportswear and sporting equipment, medical devices, sterilizable medical devices and sterilization containers, nonwoven fibers and fabrics (and articles therefrom such as drapes, gowns, filters, hygiene products, diapers, and films), oriented films, sheets, tubes, pipes, packaging, bags, sacks, coatings, caps, closures, crates, pallets, cups, non-food containers, pails, insulation, wire and cable jacketing, agricultural films, geomembranes, playground equipment, boat and water craft components, and other such articles. In particular, the compositions are suitable for automotive components such as bumpers, grills, trim parts, dashboards, instrument panels, exterior door and hood components, spoiler, wind screen, hub caps, mirror housing, body panel, protective side molding, and other interior and external components associated with automobiles, trucks, boats, and other vehicles.

Other examples of useful articles and goods may include: labware, such as roller bottles for culture growth and media bottles, office floor mats, instrumentation sample holders and sample windows; liquid storage containers such as bags, pouches, and bottles for storage and IV infusion of blood or solutions; packaging material including those for medical devices or drugs including unit-dose or other blister or bubble pack as well as for wrapping or containing food preserved by irradiation. Other useful items include packaging materials for medical devices or food which is irradiated including trays, as well as stored liquid, such as water, milk, or juice containers including unit servings and bulk storage containers.

In particular embodiments, the polyethylene composition may be particularly well-suited for applications where good stress crack resistance is a desired property. For instance, one such application is geomembranes.

Further, polyethylene compositions and/or blends comprising the compositions may be particularly well suited for forming plastic piping systems, where polyethylene of raised temperature resistance (PE-RT) that will not suffer brittle failure is desired. Polyethylene compositions such as those disclosed herein having excellent stress crack resistance properties can fill this need particularly well.

More generally, polyethylene compositions of the present disclosure (or blends comprising such compositions) would be suitable in any application where a balance of flexibility and strength is desired; e.g., bottles, drums, jars, and similar containers, as well as blown or cast films.

EXAMPLES

Catalyst Preparation

Catalyst systems (i.e., mixed/dual catalyst systems) were prepared using rac-meso-dimethylsilyl-bis((trimethylsilyl) methylcyclopentadienide) hafnium dimethyl ("Catalyst A" in this Example); and rac-meso-(1-MeInd)$_2$ZrMe$_2$ ("Catalyst B" in this Example), where Me=methyl, Ind=indenyl. Dimethyl leaving groups for the metallocenes were employed although di-chloro versions of the catalyst could have also been employed.

Catalyst Slurry Preparation

A jacketed mixer was preheated to 60° C. Mineral oil HB-380 from Sonnebom was transferred into this vessel. Oil was agitated under <3 psia vacuum at 60° C. for 3 hours. The mixer was refilled with N2. Catalyst mixture of Solid Catalyst A and Solid Catalyst B supported on silica (at a ratio of 82 moles Catalyst A: 18 moles Catalyst B) was transferred into the vessel using N2 pressure. After mixing solid catalyst and the HB-380 mineral oil to form a catalyst slurry, a first solution of unsupported Catalyst B in mineral oil (HB-380, from Sonnebom), was added to the mixture and allowed to stir (such mixture corresponding to a "pretrim slurry" or "pretrim catalyst slurry" as discussed above). The mixture was stirred for at least 3 hours, and then cooled to 40° C. The well mixed pretrim catalyst slurry was down-loaded into receiving containers.

Polymerization

Polymerization was conducted in a gas phase reactor with a 22.5" diameter. Cycle and feed gases were fed into the reactor body through a perforated distributer plate. The reactor temperature was controlled by manipulating inlet cycle gas feed, and the reactor was controlled at 290 psig and 200 psia ethylene. The pretrim catalyst slurry, prepared as described above, was fed into the reactor as a slurry (at the "Pretrim catalyst slurry" feed rate reported in Table 1) with optional additional trim solution (unsupported Catalyst B in HB-380 mineral oil) as desired (reported as the "Trim solution feed rate" in Table 1), and further with isopentane and nitrogen carriers. Ethylene monomer and hexene comonomer were both injected as gases. Other polymerization conditions for each experimental run are set forth in Table 1. Note that "catalyst dry feed rate" in Table 1 is not meant to imply that dry catalyst is also fed to the reactor; instead, it is simply a calculation of catalyst feed rate on a dry basis (e.g., ignoring mineral oil and other catalyst slurry components such as wax). It is also noted that the ratio of trim solution feed rate to pretrim catalyst slurry feed rate was adjusted for IE2 vs. IE1, showing an example of on-the-fly catalyst trim enabling differentiation in various properties (especially regarding the high molecular weight populations in IE2 as compared to IE1, as shown e.g., by different Mz and related values), while still maintaining the extreme BOCD nature of the inventive example polyethylenes.

TABLE 1

Reactor Conditions and Product Properties

| Sample | IE1 | IE2 |
|---|---|---|
| $H_2$ conc. (mol-ppm) | 174.2 | 93.0 |
| Comonomer conc. (mol %) | 0.57 | 0.50 |
| Ethylene conc. (mol %) | 65.6 | 65.7 |
| Reactor pressure (psig) | 290.0 | 289.9 |

TABLE 1-continued

| Reactor Conditions and Product Properties | | |
|---|---|---|
| Sample | IE1 | IE2 |
| Reactor temperature (° F.) | 179.6 | 172.4 |
| Pretrim catalyst slurry feed rate (cc/hr) | 54.02 | 57.61 |
| Catalyst dry feed rate (g/hr) | 10.20 | 10.87 |
| Trim solution feed rate (g/hr) | 24.5 | 15.5 |

Properties

Polyethylene compositions IE1 and IE2 produced per the above process were tested for physical properties and compared against 6 commercially available metallocene-catalyzed MDPEs with properties according to Table 2 below, noting that CET is known to be suitable for geomembrane and PE-RT applications; while CE2-CE5 are all commercial PE-RT resins.

Physical properties are set forth in Table 2 below. Additional properties determined from CFC analysis (carried out per above description) are in Table 3 below.

TABLE 2

| Properties of Example Polyethylene Compositions | | | | | | | | |
|---|---|---|---|---|---|---|---|---|
| | CE1 | CE2 | CE3 | CE4 | CE5 | CE6 | IE1 | IE2 |
| MI 2.16 (g/10 min) | 0.49 | 0.66 | 0.66 | 0.67 | 0.6 | 0.7 | 0.57 | 0.46 |
| HLMI 21.6 (g/10 min) | 26.2 | 15.92 | 11.64 | 22.44 | 17.75 | 18.78 | 15.00 | 13.4 |
| MIR | 53.4 | 24.1 | 17.6 | 33.5 | 29.6 | 26.8 | 26.3 | 29.1 |
| Density (g/cc) | 0.9365 | 0.9346 | 0.9368 | 0.9402 | 0.9358 | 0.9336 | 0.9305 | 0.9333 |
| Mn | 25,786 | 33,872 | 37,529 | 30,510 | 35,030 | 31,113 | 24,556 | 22,288 |
| Mw | 101,884 | 147,516 | 131,385 | 139,223 | 114,137 | 128,708 | 133,492 | 142,206 |
| Mz | 227,397 | 615,933 | 270,343 | 485,979 | 277,525 | 415,876 | 364,878 | 490,013 |
| Mw/Mn | 4.0 | 4.4 | 3.5 | 4.6 | 3.3 | 4.1 | 5.4 | 6.4 |
| Mz/Mw | 2.2 | 4.2 | 2.1 | 3.5 | 2.4 | 3.2 | 2.7 | 3.4 |
| Co-monomer wt % | 2.6 | 3.6 | 2.4 | 1.8 | 2.7 | 3.5 | 4.7 | 3.3 |
| SCB/1000 C | 4.3 | 4.5 | 4.0 | 3.0 | 4.5 | 4.4 | 7.8 | 5.5 |
| MIR/(Mw/Mn) | 13.4 | 5.4 | 5.0 | 7.3 | 9.0 | 6.5 | 4.8 | 4.5 |
| SCB-Slope index | 0.12 | −0.92 | 0.75 | 4.0 | 1.1 | 0.55 | 8.0 | 6.1 |
| 15-85 comonomer slope index | 0.06 | −1.0 | 0.88 | 2.94 | 0.35 | −1.3 | 7.65 | 4.77 |
| Mn-Mz comonomer slope index | 0.07 | −0.38 | 0.76 | 4.1 | 0.70 | 0.90 | 7.57 | 5.30 |
| Yield Strength (MPa) | 18.4 | 17.4 | 18.7 | 20.2 | 18.3 | 17.2 | 16.3 | 18.2 |
| 30% Yield Strength (PSI) | 802.1 | 756.9 | 813.5 | 878.7 | 796.1 | 748.2 | 709.1 | 791.7 |
| 30% Yield Strength (MPa) | 5.53 | 5.22 | 5.61 | 6.06 | 5.49 | 5.16 | 4.89 | 5.46 |
| Tensile Strength (MPa) | 36.7 | 38.5 | 44.2 | 40.8 | 35.7 | 38.2 | 40.4 | 39.8 |
| 1% secant Modulus (MPa) | 701 | 581 | 667 | 762 | 668 | 632 | 625 | 714 |
| Modulus Index | 99.8 | 93.3 | 101.6 | 99.5 | 102.5 | 103.2 | 119.0 | 123.9 |
| Elongation at Yield (%) | 11.9 | 14.2 | 12.2 | 10.9 | 10.5 | 13.2 | 12.4 | 13.0 |
| NCTL (Hrs) | >960 | >1220 | >1220 | >1220 | 82 | >1000 | >3000 | >3000 |

TABLE 3

| CFC Analysis | | | | | | | |
|---|---|---|---|---|---|---|---|
| | Mw1 (g/mol) | Mw2 (g/mol) | Tw1 (° C.) | Tw2 (° C.) | Mw1/ Mw2 ratio | Tw1- Tw2 (° C.) | RCI, m |
| IE1 | 240209.0 | 157085.8 | 77.1 | 94.9 | 1.5 | −17.9 | 81.7 |
| IE2 | 289484.7 | 178986.7 | 84.0 | 97.2 | 1.6 | −13.2 | 71.2 |

Each property was determined in accordance with the previously described test method for that property. Note that the value of Mw for the whole polymer as measured by CFC is not compatible with the same average obtained from conventional GPC. This is because the inclusion of additional length and components in the flow path of the CFC instrument, before the sample enters the GPC columns within the instrument, increases band-broadening effects which cause the Mw obtained by CFC to be, in general, larger than from GPC. Therefore the value of Mw of the whole polymer, obtained as a weighted average of Mw1 and Mw2 reported in Table 3 (determined by CFC) for IE1 and IE2, will differ substantially from the Mw values in Table 2, determined by GPC. While CFC is excellent for comparing the two fractions (e.g., through the Mw1/Mw2 value), and also at determining elution temperature of the fractions, the individual Mw1 and Mw2 values are less reliable indicators of overall molecular weight properties of the composition than the GPC methods described herein, which is why for purposes of this disclosure overall Mw is determined per GPC as described above.

Note also that the NCTL property testing, per ASTM D5397 Appendix, states that testing stress used for that test be equal to 30% of the material's yield strength. We report the 30% yield strength for each material in Table 2 (in PSI for compatibility with the test). 800 PSI is approximately the average 30% yield strength and, importantly, IE1 and IE2 have even lower values for 30% yield strength. This means using 800 PSI as the testing stress for all samples provided a simplified testing approach, while also if anything providing a conservative estimate of NCTL results for IE1 and IE2 (as the ASTM D5397 test would otherwise call for application of lower stress of about 709.1 and 791.7 PSI stress).

The data also reveal useful information regarding potential applications of the IE1 and IE2. For example, for geomembrane applications, GM13 is an industrial standards document published by Geosynthetic Institute that requires a resin to have NCTL value of at least 500 hours when testing stress equals 30% of the yield strength. Here, IE1 and IE2, with even higher testing stress (as noted), far surpass this requirement (and in fact demonstrate better stress crack resistance per NCTL testing than all other comparative resins).

The superior stress crack resistance of IE1 and IE2 is also expected to indicate good compatibility in PE-RT applications.

Further, mechanical strength and flexibility are often conflicting properties. Applications such as PE-RT pipes require a delicate balance of mechanical strength and flexibility. Mechanical strength is a known function of density, molecular weight and molecular weight distribution. Their correlation can be expressed by the Modulus index, reported in Table 2. All CE are within the same box having Modulus index about 100+/−3, IE1 and IE2 have higher values and are apparently in a different box. IE1 and IE2 achieve higher modulus at given density, molecular weight and molecular weight distribution. The novel MDPE compositions can therefore allow for lowering density for better flexibility and stress crack resistance, while still meeting mechanical strength requirements.

Also of note is the MIR/(Mw/Mn) values of IE1 and IE2 as compared to CE1 to CE6. As discussed above, a higher MIR vs. Mw/Mn indicates rheology consistent with a substantial degree of long-chain branching. Through this relationship it can be seen that the inventive polyethylene compositions exhibit a much lesser degree of rheology consistent with long-chain-branching, than do the comparative examples, indicating that IE1 and IE2 have substantially less long chain branching (LCB).

In addition, FIG. 2*a* plots the molecular weight distributions (lefty-axis) and SCB/1000 Carbons (right y-axis) vs. the log(MW) for the comparative and inventive resins; likewise, FIG. 2*b* plots the molecular weight distributions (left y-axis) and comonomer wt % (right y-axis) vs. the log(MW) for the comparative and inventive resins. As can be seen, all the resins have generally similar distribution of molecular weights, but substantially different degree of comonomer incorporation distribution (and/or SCB distribution). In particular, IE1 and IE2 demonstrate extremely BOCD character; CE4 demonstrates some degree of orthogonality (higher incorporation of comonomer in higher-molecular-weight fractions), but to a much lesser degree than IE1 and IE2. This finding is quantified in part by the reported BOCD-Slope Index of Table 2, setting out the slope of comonomer wt % vs. log(MW) for $4.5 \leq \log(MW) \leq 5.5$.

FIG. 3 is a plot of complex viscosity vs. angular frequency for the inventive examples and the comparative examples CE1 and CE3-CE6. As can be seen, the inventive resins exhibit a highly similar degree of shear-thinning behavior to the comparative resins, showing that the improved BOCD and accompanying improved strength properties are achieved without sacrificing processability.

Phase angle and complex modulus of all examples could be obtained from the SAOS measurements at 170° C. described in the testing method section of this document. Phase angle and complex modulus are graphed to obtain the so-called van-Gurp plot per FIG. 9 on page 2285 of Polymer Engineering and Science, November 2000, Volume 40, NO. 11, as shown in FIG. 4. It is apparent CE1 and CE5 have a downshift in phase angle at lower complex modulus, indicating they are more elastic due to long chain branching. CE1 and CE5 also have values of the ratio MIR/(Mw/Mn) of 13. 4 and 9, higher than values of all other tested examples. The high values of CE1 and CE5 are in line with the van-Gurp plot, reflecting more degree of LCB in those comparative examples.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having the benefit of this disclosure, will appreciate that other embodiments can be devised which do not depart from the scope and spirit of the present disclosure.

What is claimed is:

1. A polyethylene composition comprising:

80 wt % to 99.9 wt % ethylene-derived content, and 0.1 wt % to 20wt % units derived from one or more $C_3$ to $C_{40}$ α-olefin comonomers, each wt % being based on ethylene content plus $C_3$ to $C_{40}$ α-olefin comonomer content;

wherein the polyethylene composition has:

a density from 0.925g/cm$^3$ to 0.950 g/cm$^3$;

melt index at 2.16kg loading ($I_{2.16}$) from 0.1 g/10 min to 5 g/10 min;

melt index ratio at 21.6 kg loading over at 2.16 kg loading (MIR, $I_{21.6}/I_{2.16}$) less than or equal to 45:

ratio MIR/(Mz/Mw) less than 5:

Broad Orthogonal Composition Distribution (BOCD) index greater than 6;

molecular weight distribution (Mw/Mn) of at least 4.0, wherein Mw is a weight-average molecular weight and Mn is a number-average molecular weight;

ratio of z-average molecular weight to weight-average molecular weight (Mz/Mw) of less than 5, wherein Mz is a measure of an average molecular weight of the polyethylene composition; and broad orthogonal composition distribution short chain branching (SCB)-Slope Index greater than 5.

2. The polyethylene composition of claim 1, wherein the $C_3$ to $C_{40}$α-olefin comonomers comprise 1-butene; 1-hexene, 1-octene, or combinations thereof, further wherein the ethylene content is 94 to 98 wt % and the comonomer content is 2 to 6 wt %, said wt % s on the basis of total mass of ethylene and comonomer content.

3. The polyethylene composition of claim 1, wherein the polyethylene composition has SCB-Slope Index greater than or equal to 6.

4. The polyethylene composition of claim 1, further having the following properties:

z-average molecular weight (Mz) within the range from 250,000 to 700,000 g/mol;

weight-average molecular weight (Mw) within the range from 90,000 to 300,000 g/mol;

Mz/Mw ratio less than 4; and

Mw/Mn of at least 5.0.

5. The polyethylene composition of claim 1, having one or more of the following properties:

(a) modulus index greater than 110;

(b) single point notched constant tensile load (NCTL) value greater than 3000 hours; and (c) elongation at yield greater than 12%.

6. The polyethylene composition of claim 1, having mole-based reverse comonomer index (RCI,m) within the range from 60 to 100.

7. The polyethylene composition of claim 1, wherein Tw1-Tw2 of the polyethylene composition is within the range from --5 to −30° C., wherein Tw1 is the weight-average elution temperature of the first half of the polyethylene composition determined per cross-fractionation chromatography (CFC), and Tw2 is the weight-average elution temperature of the second half of the polyethylene composition.

8. The polyethylene composition of claim 1, wherein the polyethylene composition is made by polymerizing ethylene and the one or more $C_3$ to $C_{40}$ α-olefins in the presence of a catalyst system comprising a bis-cyclopentadienyl hafnocene and a zirconocene, further wherein the bis-cyclopentadienyl hafnocene is represented by one of the following formulas A1 or A2 and the zirconocene is represented by the formula B, wherein:

formula A1 is $Cp^ACp^BM'X'_n$, wherein $Cp^A$ is a cyclopentadienyl group which may be substituted or unsubstituted, provided that $Cp^A$ is substituted with at least one R group, where R is a group containing at least three carbon and/or silicon atoms;

$Cp^B$ is a cyclopentadienyl group which may be unsubstituted or substituted by one, two, three, four, or five R** groups;

M' is Hf, each X' is, independently halogen or $C_1$ to $C_{12}$ alkyl or $C_5$ to $C_{12}$ aryl; and n is 0, 1, 2, 3, or 4 formula A2 is a hafnocene represented by the following formula

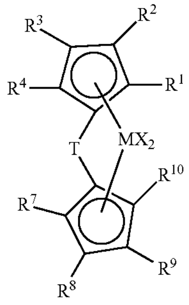

where:

M is Hafnium;

each $R^1$, $R^2$, and $R^4$ is independently hydrogen, alkoxide, or a $C_1$ to $C_{40}$ substituted or unsubstituted hydrocarbyl group;

$R^3$ is independently hydrogen, alkoxide or a $C_1$ to $C_{40}$ substituted or unsubstituted hydrocarbyl group, or $R^3$ is $—R^{20}\text{-}SiR'_3$ or $—R^{20}\text{-}CR'_3$, where $R^{20}$ is a $C_1$ to $C_4$ hydrocarbyl, and each R' is independently a $C_1$ to $C_{20}$ substituted or unsubstituted hydrocarbyl;

each $R^7$, $R^8$, and $R^{10}$ is independently hydrogen, alkoxide or a $C_1$ to $C_{40}$ substituted or unsubstituted hydrocarbyl group;

$R^9$ is —$R^{20}$-SiR'$_3$ or —$R^{20}$—CR'$_3$, where $R^{20}$ is a $C_1$ to $C_4$ hydrocarbyl, and each R' is independently a $C_1$ to $C_{20}$ substituted or unsubstituted hydrocarbyl;

T is a bridging group represented by the formula $R^a{}_2J$ or $(R^a{}_2J)_2$, where J is C, Si, or Ge, and each $R^a$ is, independently, hydrogen, halogen, $C_1$ to $C_{20}$ substituted or unsubstituted hydrocarbyl, and two $R^a$ can form a cyclic structure including aromatic, partially saturated, or saturated cyclic or fused ring system; and each X is, independently, halogen or $C_1$ to $C_{12}$ alkyl or aryl; and formula B is $T_yCp_mM^6G_nX^5{}_q$, where each Cp is, independently, a cyclopentadienyl group, which may be substituted or unsubstituted, provided that at least one Cp is an indene or fluorene group;

$M^6$ is a zirconium;

G is a heteroatom group represented by the formula JR*z where J is N, P, O, or S and R* is a C1 to C20 hydrocarbyl group and z is 1 or 2;

T is a bridging group;

y is 0 or 1;

$X^5$ is a halide, a hydride, an alkyl group, an alkenyl group or an arylalkyl group;

m is 1 or 2;

n is 0, 1, 2, or 3;

q is 0, 1, 2, or 3; and the sum of m+n+q is equal to 4.

9. The polyethylene composition of claim 8, wherein the catalyst system is formed by a process comprising:

(a) preparing a pre-trimmed catalyst slurry by combining components comprising:

(a-1) catalyst particles comprising the bis-cyclopentadienyl hafnocene and the zirconocene on one or more catalyst supports;

(a-2) an oil;

(a-3) optionally a wax; and (a-4) a first solution of unsupported zirconocene in oil; and (b) forming a trimmed catalyst slurry by combining the pre-trimmed catalyst slurry with a trim solution, the trim solution comprising a second solution of unsupported zirconocene in oil.

10. An article comprising the polyethylene composition of claim 1, wherein the article is selected from the group consisting of: pipe, cast film, blown film, geomembranes, and containers, and wherein the article further optionally comprises one or more of colorants and recycled polymeric material.

11. A polyethylene composition comprising:

80 wt % to 99.9 wt % ethylene-derived content, and 0.1 wt % to 20 wt % units derived from one or more $C_3$ to $C_{40}$ α-olefin comonomers, each wt % being based on ethylene content plus $C_3$ to $C_{40}$ α-olefin comonomer content;

wherein the polyethylene composition has:

a density from 0.925 g/cm$^3$ to 0.950 g/cm$^3$;

melt index at 2.16 kg loading ($I_{2.16}$) within the range from 0.1 to 2 g/10 min;

melt index ratio at 21.6 kg loading over at 2.16 kg loading ($I_{21.6}/I_{2.16}$) within the range from 15 to 45;

ratio of z-average molecular weight to weight-average molecular weight (Mz/Mw) less than 5, wherein Mz is a measure of an average molecular weight of the polyethylene composition;

Mw/Mn ratio of 4 or more, wherein Mn is a number-average molecular weight;

Ratio of melt index ratio to (Mw/Mn) less than 5; and further wherein the polyethylene composition has composition distribution such that a linear regression of number of short chain branches per 1000 carbons (#SCB) plotted against the log of molecular weight (Log (MW)) per GPC, exhibits one or more of the following properties (a), (b), and (c):

(a)

$$\frac{[\#SCB_{5.5} - \#SCB_{4.5}]}{5.5 - 4.5} \geq 5.5,$$

where $\#SCB_{5.5}$ is #SCB at Log(MW)=5.5, $\#SCB_{4.5}$ is #SCB at Log (MW)=4.5, and [$\#SCB_{5.5}$-$\#SCB_{4.5}$] represents the linear regression of the #SCB plot for $4.5 \leq \log(MW) \leq 5.5$;

(b) 15-85 Comonomer Slope Index greater than 4; and (c) Mn-Mz Comonomer Slope Index greater than 5.

12. The polyethylene composition of claim 11, having one or more of the following properties:

(a) modulus index greater than 110;

(b) single point notched constant tensile load (NCTL) value greater than 3000 hours; and (c) elongation at yield greater than 12%.

G is a heteroatom group represented by the formula $JR^*_z$ where J is N, P, O or S, and R* is a $C_1$ to $C_{20}$ hydrocarbyl group and z is 1 or 2;

T is a bridging group;

y is 0 or 1;

$X^5$ is a halide, a hydride, an alkyl group, an alkenyl group or an arylalkyl group;

m is 1 or 2;

n is 0, 1, 2 or 3;

q is 0, 1, 2, or 3; and the sum of m+n+q is equal to 4.

13. The polyethylene composition of claim 11, having mole-based reverse comonomer index (RCI,m) within the range from 60 to 100.

14. The polyethylene composition of claim 11, wherein Tw1-Tw2 of the polyethylene composition is within the range from −5 to −30° C., wherein Tw1 is the weight-average elution temperature of the first half of the polyethylene composition determined per cross-fractionation chromatography (CFC), and Tw2 is the weight-average elution temperature of the second half of the polyethylene composition.

15. A method of making a polyethylene composition, the method comprising:

polymerizing ethylene and one or more $C_3$ to $C_{40}$ α-olefins in a polymerization reactor in the presence of a catalyst system comprising a bis-cyclopentadienyl hafnocene and a zirconocene, and obtaining the polyethylene composition according to claim 1;

wherein the catalyst system is a first trimmed catalyst slurry formed by a process comprising:

(a) preparing a pre-trimmed catalyst slurry by combining components comprising:

(a-1) catalyst particles comprising the bis-cyclopentadienyl hafnocene and the zirconocene on one or more catalyst supports;

(a-2) an oil;

(a-3) optionally a wax; and (a-4) a first solution of unsupported zirconocene in oil; and (b) forming a first trimmed catalyst slurry by combining the pre-trimmed catalyst slurry with a first amount of trim solution, the trim solution comprising a second solution of unsupported zirconocene in oil.

16. The method of claim 15, wherein polymerizing the ethylene and the one or more $C_3$ to $C_{40}$ α-olefins to obtain the polyethylene composition takes place at time $t_1$, and wherein the method further comprises:

at time $t_z$ after time $t_1$, combining an additional portion of the pre-trimmed catalyst slurry with a second amount of the trim solution to form a second trimmed catalyst slurry, providing the second trimmed catalyst slurry to the polymerization reactor, and therein polymerizing additional ethylene and additional $C_3$ to $C_{40}$ α-olefins in the presence of the second trimmed catalyst slurry to form a second polyethylene composition;

wherein the second amount of the trim solution is different from the first amount of the trim solution.

17. The method of claim 15, wherein polymerizing the ethylene and the one or more $C_3$ to $C_{40}$ α-olefins to obtain the polyethylene composition takes place at time $t_1$, and wherein the method further comprises:

at time $t_3$, providing a further portion of the pre-trimmed catalyst slurry to the polymerization reactor without adding trim solution, and therein polymerizing further ethylene and further $C_3$ to $C_{40}$ α-olefins in the presence of the further portion of the pre-trimmed catalyst slurry to form a second third-polyethylene composition.

18. The method of claim 17, wherein time $t_3$ is after a time $t_2$.

19. The method of claim 15, wherein the polyethylene composition has one or more properties that differ from the properties either or both of a second polyethylene composition and a third polyethylene composition, wherein the differing properties are selected from Mw, Mz, Mw/Mn, Mz/Mw, density, a melt index (MI), a high loading melt index (HLMI), a melt index ratio (MIR), and combinations thereof.

* * * * *